United States Patent
Ofek

(10) Patent No.: US 8,988,913 B2
(45) Date of Patent: Mar. 24, 2015

(54) SELECTIVE CONTROL FOR IMPROVING SWITCHED POWER SUPPLIES

(75) Inventor: Eran Ofek, Modiin (IL)

(73) Assignee: Strategic Patent Management, LLC, Philadelphia, PA (US)

( * ) Notice: Subject to any disclaimer, the term of this patent is extended or adjusted under 35 U.S.C. 154(b) by 281 days.

(21) Appl. No.: 13/538,250

(22) Filed: Jun. 29, 2012

(65) Prior Publication Data

US 2013/0278224 A1 Oct. 24, 2013

Related U.S. Application Data

(60) Provisional application No. 61/625,902, filed on Apr. 18, 2012, provisional application No. 61/665,766, filed on Jun. 28, 2012.

(51) Int. Cl.
*H02M 7/217* (2006.01)
*H02J 7/00* (2006.01)

(52) U.S. Cl.
USPC .......................................... 363/127; 320/166

(58) Field of Classification Search
USPC .......................................... 363/127; 320/166
See application file for complete search history.

(56) References Cited

U.S. PATENT DOCUMENTS

| | | | |
|---|---|---|---|
| 5,225,765 A | | 7/1993 | Callahan et al. |
| 5,475,296 A | | 12/1995 | Vinsant et al. |
| 5,581,454 A | | 12/1996 | Collins |
| 6,323,623 B1 * | | 11/2001 | Someya et al. ............... 320/166 |
| 6,351,396 B1 | | 2/2002 | Jacobs |
| 7,412,612 B2 | | 8/2008 | Maple et al. |
| 8,018,171 B1 | | 9/2011 | Melanson et al. |
| 2004/0036458 A1 | | 2/2004 | Johnson et al. |
| 2007/0121355 A1 * | | 5/2007 | Zierhofer ...................... 363/125 |
| 2007/0273430 A1 | | 11/2007 | Akashi et al. |
| 2008/0031023 A1 | | 2/2008 | Kitagawa et al. |
| 2008/0224629 A1 | | 9/2008 | Melanson et al. |
| 2009/0129133 A1 | | 5/2009 | Khan |
| 2009/0262562 A1 | | 10/2009 | Yang |
| 2011/0050326 A1 | | 3/2011 | Cook et al. |
| 2011/0199016 A1 | | 8/2011 | Rinaldi |
| 2011/0227633 A1 | | 9/2011 | Mo et al. |
| 2012/0112720 A1 | | 5/2012 | Remmert |
| 2013/0279223 A1 | | 10/2013 | Ofek |
| 2013/0279224 A1 | | 10/2013 | Ofek |
| 2013/0279226 A1 | | 10/2013 | Ofek |

FOREIGN PATENT DOCUMENTS

| | | |
|---|---|---|
| EP | 1283590 A2 | 2/2003 |
| EP | 2590305 A1 | 5/2013 |
| GB | 1197968 A | 7/1970 |

* cited by examiner

*Primary Examiner* — Adolf Berhane
*Assistant Examiner* — Gary Nash
(74) *Attorney, Agent, or Firm* — Volpe and Koenig, P.C.

(57) ABSTRACT

A power converter and a method of operation thereof is disclosed including an input, an output, a sensor unit, a switched power converter, and a processor module. The power converter may convert an input power into an output power. The power converter may sense real-time measurements of the input power and the output power to determine a real-time calculated efficiency. The power converter may chop the input power into sized and positioned portions of the input power based on a plurality of determined operating parameters. The power converter may determine the operating parameters based on the real-time calculated efficiency and on a plurality of other operating factors/conditions.

20 Claims, 13 Drawing Sheets

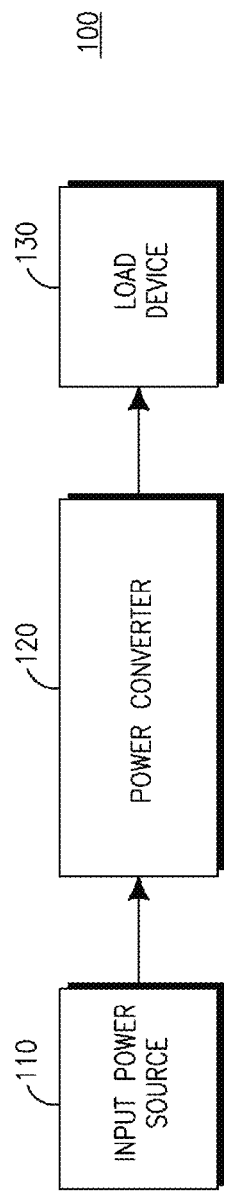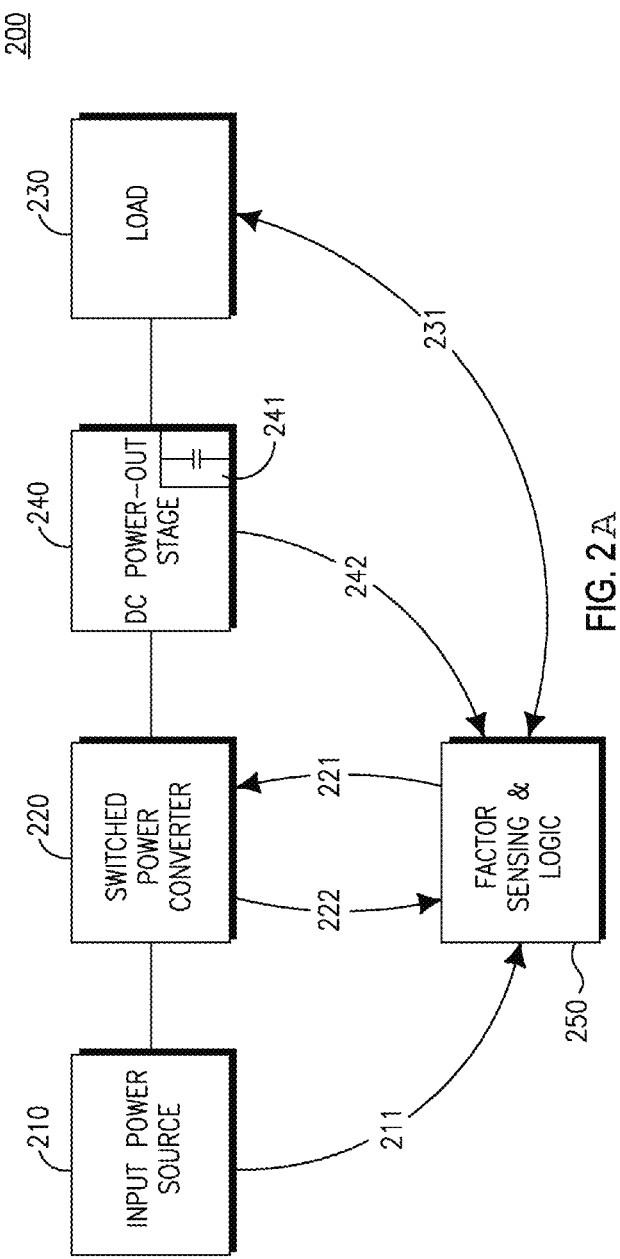

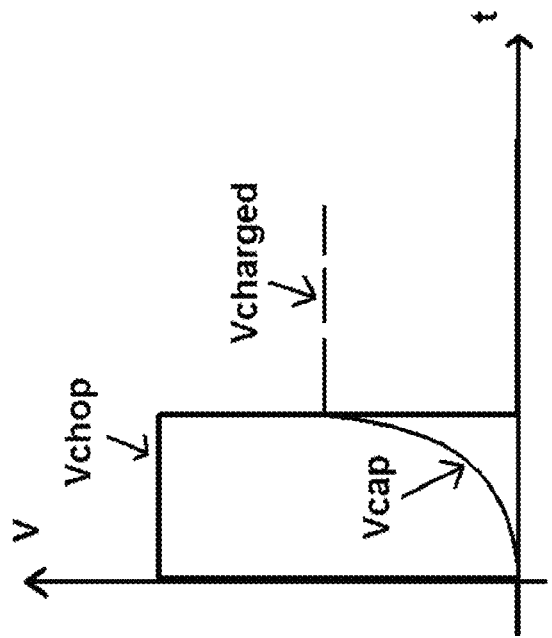
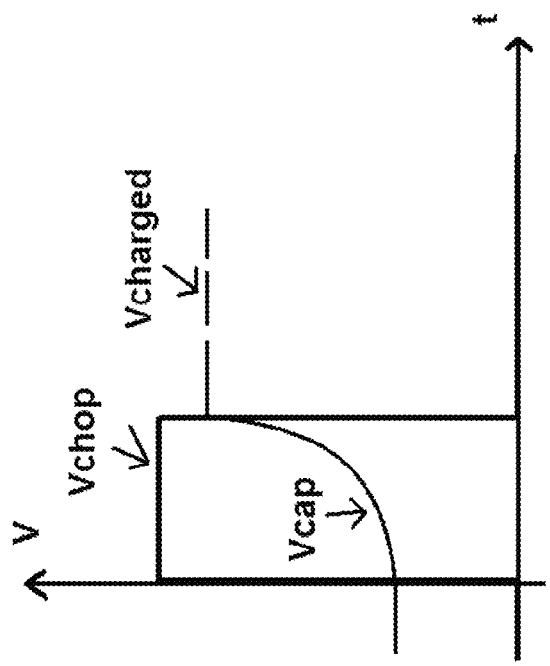
FIG. 12

SELECTIVE CONTROL FOR IMPROVING SWITCHED POWER SUPPLIES

CROSS REFERENCE TO RELATED APPLICATION

This application claims priority from U.S. Provisional Patent Application No. 61/625,902 filed on Apr. 18, 2012 and from U.S. Provisional Patent Application No. 61/665,766 filed on Jun. 28, 2012, which are incorporated by reference as if fully set forth.

FIELD OF INVENTION

The present invention is related to power conversion.

BACKGROUND

Supplying a clean direct current (DC) power source to electronic devices in an efficient manner has become increasingly important. Power converters are used to take an alternating current (AC) or DC source as an input and generate at its output a clean DC voltage to power electronics connected to the power converter. Conventionally, a power converter receives as an input an AC voltage and converts it to a DC supply voltage to power devices such as laptops, desktop computers, computer servers, mobile phones, televisions, home appliances, battery chargers, or any other electrically powered devices requiring a DC voltage source.

One conventional method for performing such AC to DC power conversion uses linear power supply. Linear power supplies conventionally step down the AC voltage using a transformer, rectify the stepped-down voltage with a rectifier bridge, smooth the rectified voltage with an output capacitor to generate, and regulate the smoothed output voltage with a regulator. Linear power supplies often suffer from low power conversion efficiency from the input AC power to the output DC power. Furthermore, the necessary size of a transformer for systems operating at a line frequency of 50 Hz-60 Hz is too large for portable applications and is often relatively expensive.

A second conventional method for performing AC to DC conversion uses switch-mode power supplies. Switch-mode power supplies typically have a smaller form-factor than comparable linear power supplies. However, switch-mode power supplies have undesirable non-linear characteristics that may introduce harmonics and power factor problems. Furthermore, many switch-mode power supplies may not adapt well to varying operating factors/conditions.

Conventional switch-mode power supplies chop a full sine wave input, harvest the associated energy from the chopped input portion, convert and transfer the energy from the chopped input portion to the DC output stage. The chopping is not dependent on the input waveform, but rather a static, timed chopping procedure. For instance, conventional power supplies may be designed to chop a full sine wave input such that all portions of the waveform are chopped at regular intervals, for instance regularly spaced intervals at a rate of 120,000 times per second, and transferred to the output regardless of the actual behavior and zero-crossing timing of the input waveform. Alternatively, a conventional power supply may be designed to take portions of the input equally sized in energy. In this way, the system is designed to take statically defined, equal in energy portions of the input waveform to produce the DC output. Such systems are designed to take input portions at predefined moments wherein a portion taken from a lower voltage region of the input is wider than a portion taken from a higher voltage region such that the energy harvested from each portion is equal to the energy harvested from the other portions. In the constant width portion example and in the constant energy portion example, portions of an input voltage waveform are always taken in the same way and at the same moments from one period (or half-period) to the next. Furthermore, conventional power converters do not recalibrate based on direct measurements of efficiency. Conventional power converters perform measurements to ensure sufficient power is delivered to the output without direct considerations for efficiency. Conventional power converters may indirectly monitor and control efficiency by, for instance, monitoring and controlling an input current. Also, conventional power converters use rectifiers that are inherently lossy. Conventional converters also do not predict a change in future operation based on current operating factors/conditions and historically demonstrated operating factors/conditions.

There is a need for more efficient power conversion. There is a need to more efficiently harvest and use the input waveform when performing power conversion than is done in conventional converters. There is a need to adjust how power is converted based on operating factors/conditions and to harvest and use portions of the input based on these operating factors/conditions. Furthermore, there is a need to selectively use any portions of the entire input sine wave to optimize operation and maintain operating conditions within acceptable thresholds. There is also a need to operate at high frequencies, which allows for the use of smaller components than those used in conventional linear supplies.

SUMMARY

Disclosed is a method and apparatus for controlling the switching in a switched power converter according to actual efficiency measured, for example, in real-time by dividing the output power by the input power of the switched power converter. Measuring may be done constantly, periodically, at programmable times, or through any other appropriate manner. Efficiency may be derived through voltage and current readings at the input and voltage and current readings at the output.

In accordance with one embodiment, a power converter may sample and calculate, at high frequency, present real-time voltage values and current values or root-mean-square (RMS) voltage values and RMS current values of an AC input source or a DC input source. At times, the power converter may adjust the rate at which it samples and calculates voltage, current, RMS, etc. values. The power converter may sample and calculate present, real-time voltage and current values of a DC output. From these calculations, an actual efficiency of the power converter may be derived. The power converter may be designed to optimize the efficiency while managing a plurality of other factors/conditions and attempting to maintain operation within acceptable operating limits.

The converter may start with approximate operating parameters based on a DC output voltage and a resistance or current draw of a load. The converter may adjust starting and stopping of one or more periods during which the input power may be used for conversion to output power. The starting and stopping of one or more periods may be dependent on a multitude of operating factors/conditions, including: power conversion efficiency, harmonics, temperature, expected output voltage, stored energy level, inductance-based energy storage, storage capacitor voltage, start-up energy storage levels, output ripple, voltage and current draw of the load, rate of discharge of the storage capacitor, voltage and current of the input power source, frequency of the input power source, the rate of change or slope of the input power source, the resonant frequency and a change in the resonant frequency of an LLC converter, the temperature of the LLC converter, the present position along the input A/C waveform, the fluctuation profile of power consumption of the load, power factor, information or commands provided by the load or user, over-voltage and/or over-current conditions of the input and/or output, mechanical noise or vibrations, characteristics of the mechanical noise or vibrations, noise profile of the input power source, electromagnetic interference (EMI), any other factor (or combination of factors) which may be desirably affected, controlled, adjusted and/or monitored.

BRIEF DESCRIPTION OF THE DRAWINGS

A more detailed understanding may be had from the following description, given by way of example in conjunction with the accompanying drawings wherein:

FIG. 1 is a system diagram of a conventional power converter system;

FIG. 2A is a system diagram of an example power converter system in which one or more disclosed embodiments may be implemented;

FIG. 12 includes two plots of exemplary voltage portions and the resultant partially charged voltage across a capacitor.

DETAILED DESCRIPTION

Figure 2B:
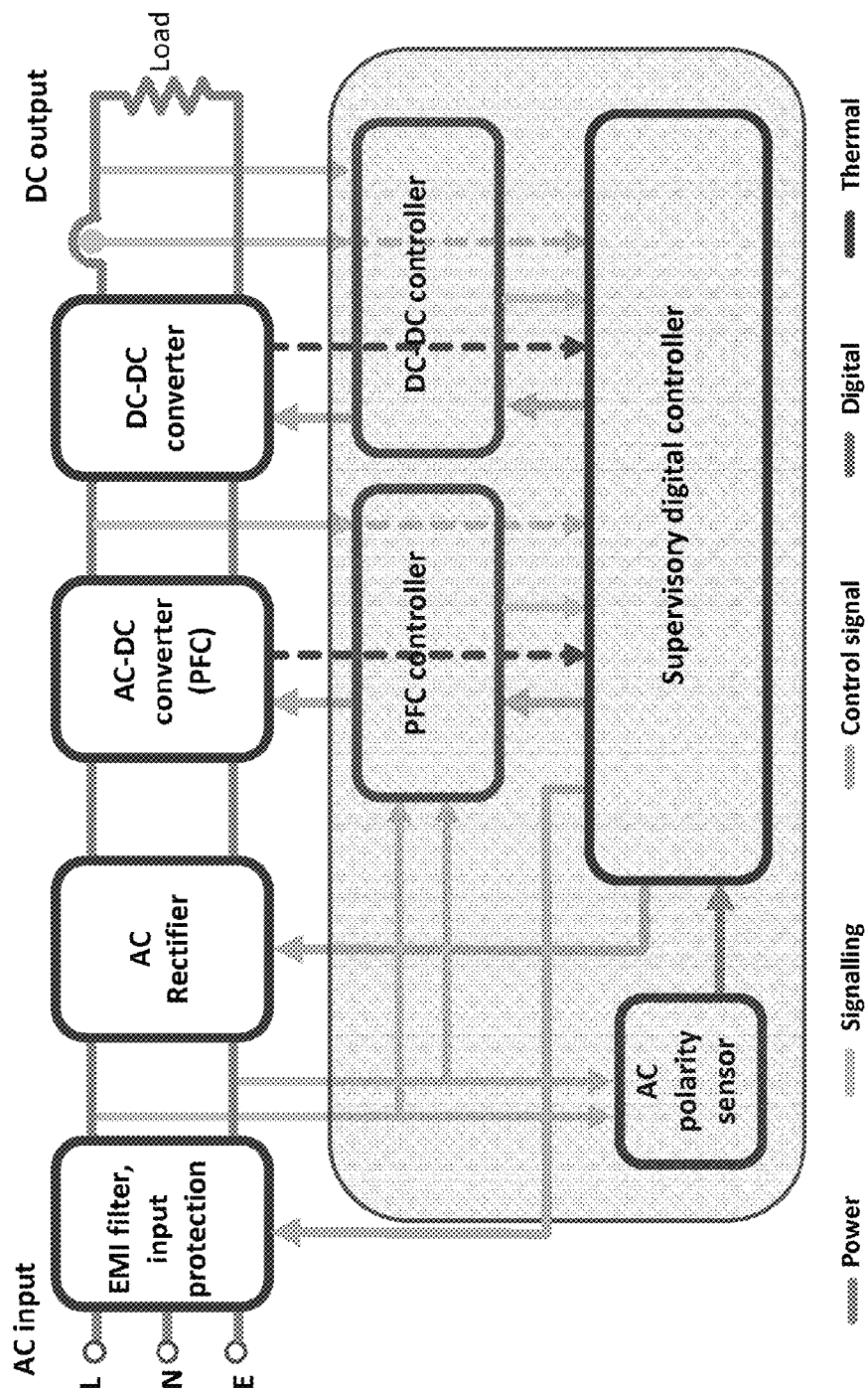
FIG. 2B is a system diagram of another example power converter system in which one or more disclosed embodiments may be implemented.

In one embodiment, a power converter may include an input configured to receive input power from an input power source, an output configured to generate a converted power, a sensor unit configured to sense real-time measurements of the converted power and the input power, a switched power converter configured to chop the input power into portions and deliver energy harvested from the portions to the output based on a plurality of operating parameters, and a processing module. The processing module may be configured to calculate an efficiency based on the real-time measurements, determine a position and size of one or more portions of the input power based on the calculated efficiency, and set the plurality of operating parameters based on the determined position and size of the one or more portions of the input power.

In another embodiment, the power converter may include one or more sensors, such as temperature sensors, each configured to sense a condition, such as a temperature of one or more components of the power converter.

In another embodiment, the switched power converter may include one or more switches, wherein the plurality of operating parameters include parameters to open and close the one or more switches such that the one or more switches are configured to open and close based on the determined position and size of the one or more portions of the input power.

In another embodiment, the processing module may be further configured to determine the position and size of the one or more portions of the input power based on operating factors/conditions.

In another embodiment, the processing module may be further configured to determine the position and size of the one or more portions of the input power based on real-time load requirements.

In another embodiment, the processing module may be further configured to measure an effect of at least one of the plurality of operating parameters on the calculated efficiency.

In another embodiment, the processing module may be further configured to determine an order in which the operating parameters may be set based on the measured effect of the at least one of the plurality of operating parameters on the calculated efficiency.

In another embodiment, the order in which the operating parameters are set may be determined to optimize a speed with which the power converter determines an optimal efficiency.

In another embodiment, the processing module may be further configured to determine an order in which the operating parameters may be set based on an effect of the at least one of the plurality of operating parameters on at least one operating factor/condition.

In another embodiment, a method for converting power is disclosed. The method may include receiving input power from an input power source, generating a converted power at an output, sensing real-time measurements of the converted power and the input power, chopping the input power into portions and delivering the energy harvested from the portions to the output based on a plurality of operating parameters, calculating an efficiency based on the real-time measurements, determining a position and size of one or more portions of the input power based on the calculated efficiency, and setting the plurality of operating parameters based on the determined position and size of the one or more portions of the input power.

In another embodiment, a method for converting power may include sensing a condition, such as a temperature of one or more components of the power converter.

In another embodiment, a method for converting power may include opening and closing one or more switches based upon the plurality of operating parameters such that the one or more switches are opened and closed based on the determined position and size of the one or more portions of the input power.

In another embodiment, a method for converting power may include determining the position and size of the one or more portions of the input power based on operating factors/conditions.

In another embodiment, a method for converting power may include determining the position and size of the one or more portions of the input power based on real-time load requirements.

In another embodiment, a method for converting power may include measuring an effect of at least one of the plurality of operating parameters on the calculated efficiency.

In another embodiment, a method for converting power may include determining an order in which the plurality of operating parameters are set based on the measured effect of the at least one of the plurality of operating parameters on the calculated efficiency.

In another embodiment, a method for converting power may include determining the order in which the plurality of operating parameters are set to optimize a speed with which the power converter determines an optimal efficiency.

In another embodiment, a method for converting power may include determining an order in which the plurality of operating parameters are set based on an effect of at least one of the plurality of operating parameters on at least one operating factor/condition.

In another embodiment, a power converter may include an input configured to receive an input power waveform from an input power source, an output configured to generate a converted power, a sensor unit configured to sense at least one indication of an operating condition, and a switched power converter configured to select one or more portions of the input power waveform based on the at least one indication of an operating condition and convert the one or more portions of the input power waveform to the output.

In another embodiment, the switched power converter may be further configured to convert the one or more portions of the input power waveform to the output based on the at least one indication of an operating condition.

In another embodiment, the switched power converter may be further configured to charge at least one energy storage device based on the at least one indication of an operating condition.

In another embodiment, the switched power converter may be further configured to select one or more portions of the input power waveform to satisfy a target operating condition.

In another embodiment, the switched power converter may be further configured to avoid selecting one or more portions of the input power waveform to satisfy the target operating condition.

In another embodiment, the sensor unit may be further configured to sense a change in the at least one indication of an operating condition. Furthermore, the switched power converter may be further configured to select one or more different portions of the input power waveform responsive to the sensed change in the at least one indication of an operating condition.

In another embodiment, the power converter may include a processing module configured to determine a position and size of the one or more portions of the input power waveform, and set a plurality of operating parameters based on the determined position and size of the one or more portions of the input power waveform. Furthermore, the switched power converter may be further configured to select the one or more portions of the input power waveform based on the plurality of operating parameters.

In another embodiment, the processing module may be further configured to calculate an efficiency based on real-time measurements of the input power waveform and the converted power, and set the plurality of operating parameters based on the real-time measurements.

In another embodiment, the switched power converter may be further configured to harvest energy of the one or more portions of the input power waveform and deliver the harvested energy of the one or more portions of the input power waveform to the output.

In another embodiment, a method is disclosed for converting power in a power converter, which may include receiving an input power waveform from an input power source, generating a converted power at an output, sensing at least one indication of an operating condition, selecting one or more portions of the input power waveform based on the at least one indication of an operating condition, and converting the one or more portions of the input power waveform to the output.

In another embodiment, a method for converting power may include converting the one or more portions of the input power waveform to the output based on the at least one indication of an operating condition.

In another embodiment, a method for converting power may include charging at least one energy storage device based on the at least one indication of an operating condition.

In another embodiment, a method for converting power may include selecting one or more portions of the input power waveform to satisfy a target operating condition.

In another embodiment, a method for converting power may include avoiding selecting one or more portions of the input power waveform to satisfy the target operating condition.

In another embodiment, a method for converting power may include sensing a change in the at least one indication of an operating condition, and wherein the switched power converter is further configured to select one or more different portions of the input power waveform responsive to the sensed change in the at least one indication of an operating condition.

In another embodiment, a method for converting power may include determining a position and size of the one or more portions of the input power waveform, setting a plurality of operating parameters based on the determined position and size of the one or more portions of the input power waveform, and selecting the one or more portions of the input power waveform based on the plurality of operating parameters.

In another embodiment, a method for converting power may include calculating an efficiency based on real-time measurements of the input power waveform and the converted power, and setting the plurality of operating parameters based on the real-time measurements.

In another embodiment, a method for converting power may include harvesting energy of the one or more portions of the input power waveform, and delivering the harvested energy of the one or more portions of the input power waveform to the output.

In another embodiment, a power converter may include an input configured to receive an input power waveform from an input power source, a switched power converter configured to harvest energy from one or more portions of the input power waveform, wherein the harvested energy of the one or more portions is substantially less than the available energy of the input power waveform, an energy storage device, and an output stage. The output stage may be configured to receive the harvested energy, convert the harvested energy into a converted energy, and store the converted energy in the energy storage device.

In another embodiment, the switched power converter may be further configured to select a location of a first portion of the one or more portions of the input power waveform, and select a location of a second portion of the one or more portions of the input power waveform, wherein the location of the first portion may be substantially separated in time from the location of the second portion such that the first portion may not be adjacent to the second portion.

In another embodiment, the input power waveform may be an alternating current (AC) input power waveform.

In another embodiment, the switched power converter may be further configured to selected locations of the one or more portions such that the one or more portions may be positioned along the same half-wave of the AC input power waveform.

In another embodiment, no portions of the AC input power waveform may be selected at a position between the first portion and the second portion.

In another embodiment, the first portion may be positioned prior to a peak of the half-wave and the second portion may be positioned after the peak of the half-wave.

In another embodiment, both the first portion and the second portion may be positioned on the same side of the peak of the half-wave.

In another embodiment, the location of the first portion may include a width of the first portion and the location of the second portion may include a width of the second portion. Furthermore, the switched power converted may be further configured to select the width of the first portion and the width of the second portion, wherein the width of the first portion may be different than the width of the second portion.

In another embodiment, the switched power converter may be further configured to select locations of the one or more portions of the input power waveform such that the one or more portions may be inhomogeneously positioned along the input power waveform and the one or more portions may be inhomogeneously sized.

In another embodiment, the output stage may be further configured to supply a substantially direct current (DC) voltage to a load device.

In another embodiment, a method for converting power in a power converter may include receiving an input power waveform from an input power source, harvesting energy from one or more portions of the input power waveform, wherein the harvested energy of the one or more portions may be substantially less than the available energy of the input power waveform, converting the harvested energy into a converted energy, and storing the converted energy in an energy storage device.

In another embodiment, a method for converting power in a power converter may include selecting a location of a first portion of the one or more portions of the input power waveform, and selecting a location of a second portion of the one or more portions of the input power waveform, wherein the location of the first portion may be substantially separated in time from the location of the second portion such that the first portion may not be adjacent to the second portion.

In another embodiment, a method for converting power in a power converter may include selecting locations of the one or more portions such that the one or more portions may be positioned along the same half-wave of the AC input power waveform.

In another embodiment, a method for converting power in a power converter may include the input power waveform being an alternating current (AC) input power waveform.

In another embodiment, a method for converting power in a power converter may include no portions of the AC input power waveform being selected at a position between the first portion and the second portion.

In another embodiment, a method for converting power in a power converter may include the first portion being positioned prior to a peak of the half-wave and the second portion being positioned after the peak of the half-wave.

In another embodiment, a method for converting power in a power converter may include both the first portion and the second portion being positioned on the same side of the peak of the half-wave.

In another embodiment, a method for converting power in a power converter may include the location of the first portion including a width of the first portion and the location of the second portion including a width of the second portion. The method may further include selecting the width of the first portion and the width of the second portion, wherein the width of the first portion may be different than the width of the second portion.

In another embodiment, a method for converting power in a power converter may include selecting locations of the one or more portions of the input power waveform such that the one or more portions may be inhomogeneously positioned along the input power waveform and the one or more portions may be inhomogeneously sized.

In another embodiment, a method for converting power in a power converter may include supplying a substantially direct current (DC) voltage to a load device.

In another embodiment, a power converter may include an input configured to receive an alternating current (AC) input power waveform from an input power source, a switched power converter, and an output stage. The switched power converter may be configured to harvest power from one or more portions of a first half-wave of the AC input power waveform, and harvest power from one or more portions of a second half-wave of the AC input power waveform, wherein at least one location of at least one of the one or more portions of the first half-wave may be different than at least one location of at least one of the one or more portions of the second half-wave. The output stage may be configured to receive the harvested power, and convert the harvested power into a converted power.

In another embodiment, the power converter may include an energy storage device configured to store the converted power.

In another embodiment, the power converter may include a processing module configured to select the locations of the one or more portions of the first half-wave, select the locations of the one or more portions of the second half-wave, and send control signals to the switched power converter based on the selected locations of the one or more portions of the first-half wave and based on the selected locations of the one or more portions of the second-half wave.

In another embodiment, the processing module may be further configured to determine one or more settings for the output stage, and send one or more control signals to the output stage based on the determined one or more settings.

In another embodiment, the switched power converter may be further configured to harvest power from a plurality of consecutive half-waves of the AC input power waveform such that different portions of the power may be harvested from each half-wave of the plurality of consecutive half-waves of the AC input power waveform.

In another embodiment, each of the locations of the portions may include a position and a width. Furthermore, the processing module may be further configured to select a width of a portion of the first half-wave, and select a width of a portion of the second half-wave, such that the width of the portion of the second half-wave may be wider than the width of the portion of the first half-wave.

In another embodiment, the processing module may be configured to select a different number of portions of the first half-wave than number of portions of the second half-wave.

In another embodiment, the processing module may be configured to select a location of a first portion of the one or more portions of the first half-wave, and select a location of a second portion of the one or more portions of the first half-wave, wherein the locations of the first portion and the second portion may be such that a gap exists between the first portion and the second portion in which no other portion exists.

In another embodiment, the processing module may be configured to adjust the locations of the first portion and the second portion such that corresponding portions of the second half-wave may be a different distance apart than in the first half-wave.

In another embodiment, the processing module may be configured to adjust a width of a first portion of the one or more portions of the first half-wave such that a width of a corresponding portion of the second half-wave may be different than in the first half-wave.

In another embodiment, a method for converting power in a power converter may include receiving an alternating current (AC) input power waveform from an input power source, harvesting power from one or more portions of a first half-wave of the AC input power waveform, harvesting power from one or more portions of a second half-wave of the AC input power waveform, and converting the harvested power into a converted power, wherein at least one location of at least one of the one or more portions of the first half-wave may be different than at least one location of at least one of the one or more portions of the second half-wave.

In another embodiment, a method for converting power in a power converter may include storing the converted power in an energy storage device.

In another embodiment, a method for converting power in a power converter may include selecting the locations of the one or more portions of the first half-wave, selecting the locations of the one or more portions of the second half-wave, and sending control signals to control the harvesting based on the selected locations of the one or more portions of the first-half wave and based on the selected locations of the one or more portions of the second-half wave.

In another embodiment, a method for converting power in a power converter may include determining one or more settings for an output stage, and sending one or more control signals to the output stage based on the determined one or more settings.

In another embodiment, a method for converting power in a power converter may include harvesting power from a plurality of consecutive half-waves of the AC input power waveform such that different portions of the power may be harvested from each half-wave of the plurality of consecutive half-waves of the AC input power waveform.

In another embodiment, a method for converting power in a power converter may include each of the locations of the portions including a position and a width. The method may further include selecting a width of a portion of the first half-wave, and selecting a width of a portion of the second half-wave, such that the width of the portion of the second half-wave may be wider than the width of the portion of the first half-wave.

In another embodiment, a method for converting power in a power converter may include selecting a different number of portions of the first half-wave than number of portions of the second half-wave.

In another embodiment, a method for converting power in a power converter may include selecting a location of a first portion of the one or more portions of the first half-wave, and selecting a location of a second portion of the one or more portions of the first half-wave, wherein the locations of the first portion and the second portion may be such that a gap exists between the first portion and the second portion in which no other portion exists.

In another embodiment, a method for converting power in a power converter may include adjusting the locations of the first portion and the second portion such that corresponding portions of the second half-wave may be a different distance apart than in the first half-wave.

In another embodiment, a method for converting power in a power converter may include adjusting a width of a first portion of the one or more portions of the first half-wave such that a width of a corresponding portion of the second half-wave may be different than in the first half-wave.

FIG. 1 depicts a traditional architecture for a power conversion system. System 100 may receive input power from an input power source 110 which may be an alternating current (AC) or direct current (DC) voltage or current source. The input power from the input power source 110 may then be operated on by a power converter 120 to convert the input power to an appropriate output voltage for a load device 130. Power converter 120 may include one or more rectifiers, switches, energy storage devices, transformers, transistors, diodes, and/or other traditional electrical elements used in traditional power converters. Power converter 120 may be designed to control at least one switch to chop the input power source 110 so that regularly defined portions of the input waveform are used to produce a DC voltage at the output. The at least one switch may be used to chop the input waveform at regular intervals in time, or such that the area of each chopped portion is equal, and the drawn input current is varied such that a substantially constant corresponding energy from the input power source 110 is passed through the power converter 120 to produce an output voltage to power the load device 130.

In an exemplary embodiment of an improved power conversion system for converting power from an input power source to a load, the system may comprise analog or digital controls for charging a storage capacitor to feed energy to the load. The system may not be restricted to charging a storage capacitor and may alternatively or additionally store energy in any energy storage device such as an inductor, a battery, a super capacitor, or any other energy storage mechanism. The power conversion system may control powering the load such that energy may be fed from the input power source to the load, energy may be fed from the input power source to the storage device, the energy stored in the storage device may be fed to the load, or any combination thereof. As an additional example, the power conversion system may simultaneously power the load and the storage capacitor. In another embodiment, the power conversion system may disconnect any of the input power source, storage capacitor, or load from each other. Please see PCT publication WO 2012-014202 for further details.

FIG. 2A depicts an exemplary embodiment of a high-efficiency power conversion system 200. The power conversion system 200 may include an input power source 210. The input power source 210 may be an AC or DC power source. The input power source 210 may be coupled to a switched power converter 220. The switched power converter 220 may then feed a DC power-out stage 240. The DC power-out stage 240 may be viewed as an output power stage including an energy storage device 241. FIG. 2A depicts the energy storage device 241 as a capacitor. Alternatively, the energy storage device 241 could be a plurality of capacitors or another energy storage device such as an inductor, battery, super capacitor, any other energy storage mechanism, or any combination thereof. The load 230 may be coupled to the DC power-out stage 240.

The power conversion system 200 may further include a subsystem 250 which may sense or detect operating factors/conditions and may perform logic and controls for evaluating operating factors/conditions to adjust and control the switched power converter 220 to affect the overall efficiency of the power conversion process while attempting to keep the system operating within acceptable operating condition thresholds. Subsystem 250 may receive input 211 from the input power source 210. Subsystem 250 may receive input 222 from the switched power converter 220. Subsystem 250 may receive input 242 from the DC power-out stage 240. Subsystem 250 may receive input 231 from the load 230. Subsystem 250 may monitor any combination of inputs 211, 222, 242, and 231 to track operating factors/conditions and to adjust and control power conversion based on the operating factors/conditions.

Subsystem 250 may include a processor for processing the incoming signals/inputs and for performing logic and operations to control the operation of the power conversion system 200. The subsystem 250 may adjust or control parameters through signaling 221 to determine the starting and stopping of the switches of the switched power converter 220. The processor may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor may perform signal coding, data processing, power control, input/output processing, and/or any other functionality that enables the power conversion system 200 to control the conversion of input power to output power. The processor may be coupled to inputs, outputs, sensors, memory, and any other logical connections for determining the operating factors/conditions of the system 200 and for controlling the system in real-time.

The switched power converter 220 may be controlled to chop an input waveform of the input power source 210 into selected portions. Chopping may be considered any method by which the switched power converter 220 selects and harvests a portion of the input power. Chopping may be effected by switches turning on and off to selectively allow the input of power from the input power source 220. Chopping may be effected by controlling an input resistance and raising or lowering the input resistance appropriately to control the input of power from the input power source 220. Chopping may be accomplished by any apparatus, mechanism, or methodology by which the switched power converter 220 may select and harvest energy from the input and direct the energy for conversion to the DC power-out stage 240 to be ultimately delivered to the load 230. Chopping may be accomplished by any method or apparatus for chopping an input waveform into portions of the waveform. No formal definitions or limitations are implied by the use of the term "chopping." One of ordinary skill in the art should recognize chopping to be a generic form of selectively harvesting portions of an input power from the input power source 210.

FIG. 2B depicts another exemplary embodiment of a high-efficiency power conversion system. The high-efficiency power conversion system may include an EMI filter and input protection block connected to an input power source. The system may further include an AC rectifier coupled to the EMI filter and input protection block. The system may further include an AC-DC converter with power factor correction (PFC) coupled to the AC rectifier. The system may further include a DC-DC converter coupled to the AC-DC converter. The DC-DC converter may include an LLC converter and may be coupled to a load. The system may further include a controller subsystem. The controller subsystem may include an AC polarity sensor which may be coupled to and sense the output of the EMI filter and input protection block. The AC polarity sensor may be coupled to, and output a digital signal to, a supervisory digital controller. The supervisory digital controller may receive signals from sensors which may sense operating factors/conditions of the outputs and inputs between the AC rectifier, AC-DC converter, DC-DC converter, and load. The signals from sensors may further include indications of operating factors/conditions such as voltages and currents. As shown in the exemplary embodiment of FIG. 2B, the supervisory digital controller may sense the voltage between the AC-DC converter stage and the DC-DC converter stage, and may also sense both the current and voltage output from the DC-DC converter stage. The supervisory digital controller may also receive thermal indications or signaling from the AC-DC converter and from the DC-DC converter. The supervisory digital controller may send control signals, which may be in the form of settings or of adjustments of operating parameters, to the EMI filter and input protection stage, to the AC rectifier, to a PFC controller, and/or to a DC-DC controller. The PFC controller may be coupled to and send control signals to the AC-DC converter. The PFC controller may control the AC-DC converter based on signals received from the supervisory digital controller. The PFC controller may also send feedback signals to the supervisory digital controller. The PFC controller may also sense and receive signaling from the output of the EMI filter and input protection stage. The DC-DC controller may be coupled to and send control signals to the DC-DC converter. The DC-DC controller may control the DC-DC converter based on signals received from the supervisory digital controller. The DC-DC controller may also send feedback signals to the supervisory digital controller. In this way, the exemplary system of FIG. 2B may monitor operating factors/conditions by receiving indications of the operating factors/conditions from sensors and may set operating parameters through control signals to control the selection of portions of the input waveform and the energy contained in the portions; it may control the conversion of the energy of the selected portions; and it may control the delivery of the converted energy to a storage device or to the load. Though the connections, sensor signals, control signals, and arrangements of components illustrated in FIG. 2B depict a particular embodiment, one skilled in the art should recognize various additional signals, connections, and arrangements may be possible. Furthermore, fewer signaling or control connections may be possible.

In another embodiment, a method of controlling the switching in a switched power converter is further disclosed according to actual efficiency measured, for example, in real-time by dividing the output power by the input power of the switched power converter. The input power and output power may be measured constantly, periodically, sampled, at particular predefined times, during particular portions of an AC period corresponding to a particular voltage, or any combination thereof. The method may include sampling and calculating, at high frequency and in real-time, present real-time voltage and current of an AC or DC input. Alternatively, the frequency at which the sampling and calculating of the input may be done may be adjusted higher or to lower frequencies.

For example, for a 120V AC input, the present voltage may vary from −120V nominally through 0V to +120V nominally through a period of the AC sinusoid. The method may further comprise sampling and calculating, at high frequency and in real-time, a present voltage and current of a DC output. Alternatively, the frequency at which the sampling and calculating of the output may be done may be adjusted higher or to lower frequencies. From these calculations, the actual efficiency of the power converter may be derived.

When the system is starting up, power may be fed to a start-up processor or other controlling module of the power conversion system. The power may be fed through a start-up power supply that may comprise a rectifier, a small capacitor, a battery, or any other power supply designed for start-up. Power may be supplied to wake up the start-up processor. Once the start-up processor is awake, the start-up processor may sample input source characteristics, input parameters, or any other operating factors/conditions. The input parameters may be provided by a user, provided by the load, or may be programmed into the system. The start-up processor may be implemented by a simple processor, discrete electronics, analog circuitry, any other computational device or controller, or any combination thereof.

The start-up processor may then access memory, a look-up table, dip-switches, previously stored data, or any other pre-programmed method or device to retrieve initial values for operating parameters. The start-up processor may then update the system according to the initial operating parameters. The initial operating parameters may be used to establish initial operating conditions including an initial operating output level. The start-up processor may further verify whether other operating factors/conditions are within an acceptable range. Such factors/conditions may include: power conversion efficiency, harmonics, temperature, expected output voltage, stored energy level, inductance-based energy storage, storage capacitor voltage, start-up energy storage levels, output ripple, voltage and current draw of the load, rate of discharge of the storage capacitor, voltage and current of the input power source, frequency of the input power source, the rate of change or slope of the input power source, the resonant frequency and a change in the resonant frequency of an LLC converter, the temperature of the LLC converter, the present position along the input A/C waveform, the fluctuation profile of power consumption of the load, power factor, information or commands provided by the load or user, over-voltage and/or over-current conditions of the input power source and/or output, mechanical noise or vibrations, characteristics of the mechanical noise or vibrations, noise profile of the input, electromagnetic interference (EMI), any other factor which may be desirably affected, controlled, adjusted and/or monitored, and any combination thereof.

The start-up processor may wake-up a main controller or other suitable computational device and verify whether the main controller is working properly. In one embodiment, the start-up processor may verify whether the main controller is working properly by verifying the output voltage on the storage capacitor is within an acceptable range. As mentioned previously and throughout this disclosure, an alternative storage device may be used and the start-up processor may verify that an associated energy level of the storage device is within an acceptable range. To verify the output voltage on the storage capacitor, several samples may be taken. Once the main controller has been verified to be working properly, the start-up processor and its start-up power supply may enter a sleep mode. In one embodiment, the start-up power supply may be a simple power supply. In another embodiment, the system may be designed and configured to allow initial charging of any energy storage device or devices. The energy storage devices may then be used to start up the main controller. In this way, the system may be implemented without a start-up processor.

Figure 3:
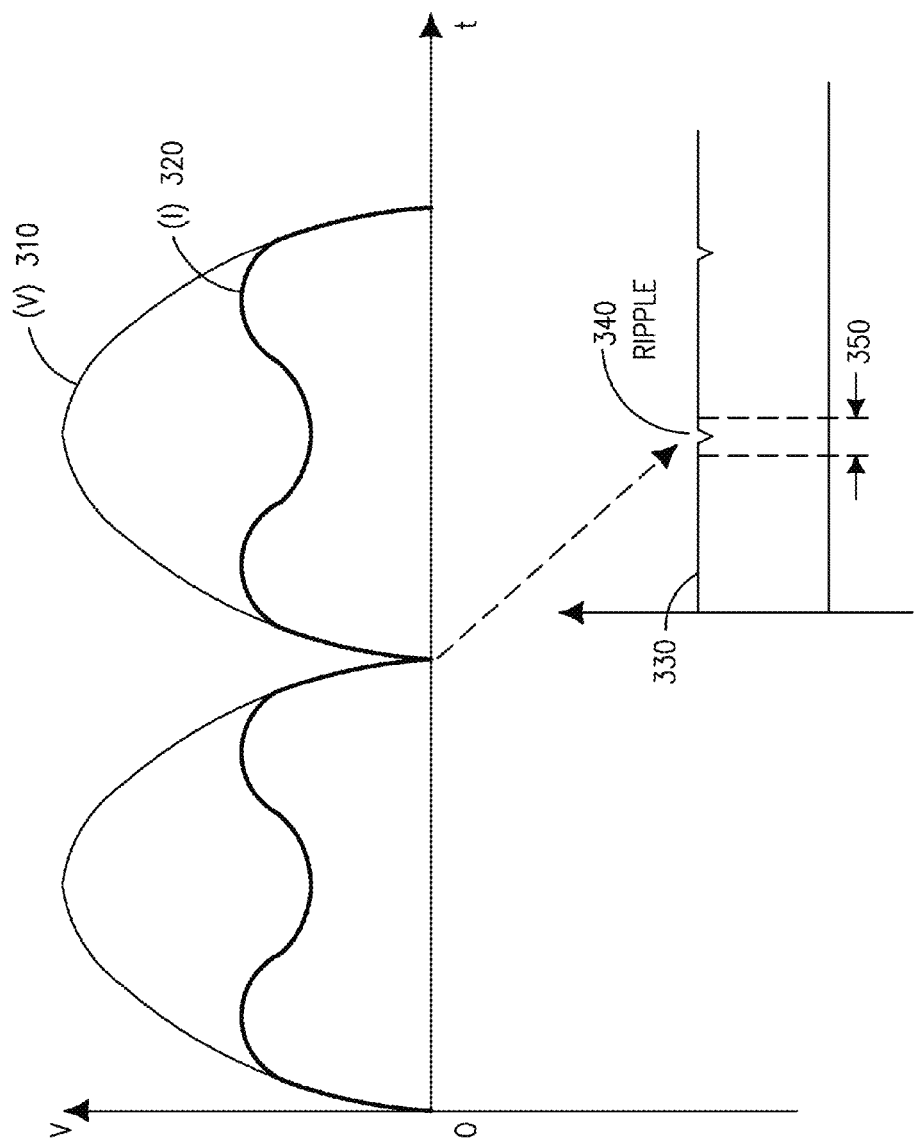
FIG. 3 is an exemplary plot of input current, input voltage, and output voltage for a power conversion system.

FIG. 3 depicts an exemplary plot of an input voltage 310 and input current 320 for an embodiment of a power conversion system. The input voltage 310 has been rectified and the input current 320 is associated with the current demands of a load and the input voltage 310. FIG. 3 further depicts an exemplary plot of an output voltage 330 corresponding to the input voltage 310 and input current 320. The output voltage 330 exhibits ripple 340 in a region of the output 350 due to the low input energy regions of the input voltage 310 near the zero-crossing.

The power conversion system may initially approximate and set operating parameters based on the DC output voltage and the resistance or current draw of the load. The operating parameters may control the state of the switches of the switched power converter to appropriately take portions of the input power for conversion to output power. The control of the switches may also influence and control the manner in which power is converted from input to output. In this way, the control of the switches may select the portions of the input power to harvest and may control how the input power is converted, stored, and delivered to the load. The power conversion system may adjust starting and stopping of one or more periods during which the input power is used for conversion to the output. The starting and stopping may be dependent on a multitude of factors, including: power conversion efficiency, harmonics, temperature, expected output voltage, stored energy level, inductance-based energy storage, storage capacitor voltage, start-up energy storage levels, output ripple, voltage and current draw of the load, rate of discharge of the storage capacitor, voltage and current of the input power source, frequency of the input power source, the rate of change or slope of the input power source, the resonant frequency and a change in the resonant frequency of an LLC converter, the temperature of the LLC converter, the present position along the input A/C waveform, the fluctuation profile of power consumption of the load, power factor, information or commands provided by the load or user, over-voltage and/or over-current conditions of the input power source and/or output, mechanical noise or vibrations, characteristics of the mechanical noise or vibrations, noise profile of the input, electromagnetic interference (EMI), any other factor which may be desirably affected, controlled, adjusted and/or monitored, and any combination thereof.

An exemplary power conversion system sets or adjusts operating parameters to control the power conversion process. In one embodiment, the operating parameters may be viewed as any controls that influence the switching of the switched power converter. For instance, operating parameters may be voltage levels, current levels, power levels, energy levels, stored digital or analog values, switch positions, or any other controllable parameter, level, or value through which the system may influence the switching of the switched power converter. By setting or adjusting operating parameters, the system may control the switching of the switched power converter to appropriately take portions of the input and appropriately convert the input portions to output power to optimize operation. An optimal operation may include maximizing power conversion efficiency while maintaining operating factors/conditions within acceptable respective thresholds.

In one embodiment, the system may control switching such that a switch controls the input of power from an input power source to optimize performance such that power conversion efficiency is optimized while managing operating parameters to maintain other operating factors/conditions within acceptable levels. The system may take portions of input power one or more times per a particular period to find an optimal operating state. For instance, for an AC input, the system may start to take power from the input when the input reaches a first level of present input voltage, and may stop taking power when the input voltage reaches a second level of present input voltage, wherein the occasions where the system starts and stops are recalibrated to optimize some or all operating factors/conditions. In another embodiment, the system may override previously determined operating parameters based on other operating factors/conditions, such as the load changing, the load being disconnected, the power consumption of the load, or any fault condition on the input or output. A fault condition may be any over/under-temperature, over/under-voltage, over/under-current, ripple, or other operating factors/conditions outside of established thresholds.

In another embodiment, the system may include circuitry to convert an input power to an output power. The circuitry may take a portion of the input power and convert it to be stored in an energy storage device or directed to a load device based on a power profile. The circuitry may chop an input source to take a portion of the input and direct the energy of the portion to one or more energy storage devices. For example, the circuitry may be controlled by operating parameters and may adjust switching such that a narrower portion is selected from the input to be converted and delivered to an energy storage device. Alternatively, the circuitry may further take a portion of an input portion to effectively select a narrower portion and convert and deliver the narrower portion to an energy storage device. The power profile may be used to control the charging and discharging of the energy storage devices to convert input power into output power. The system may take portions of any input power, for instance AC, DC or any waveform, and convert the portions of the input into an output waveform.

The system may input a portion of the input power, wherein the portion may be described as having a starting point and an ending point, and further wherein these points may be determined based on the operating factors/conditions. The starting and ending points may be characterized by a voltage level, a current level, a power level, an absolute time, a relative time, a time relative to a zero-crossing, or other characteristics. The portion may be characterized as having a starting point and a width. The portion may be characterized as having a starting point and a duration. A portion may be characterized as providing a particular amount of energy. The portion may be characterized as having a starting point that is an offset or delay from a prior event. The prior event may be a zero-crossing of an AC input or detection thereof. The prior event may be the ending point, center point, starting point, or any other point of a prior portion or detection thereof. The points of a portion may describe an associated absolute or relative phase of an input waveform or may describe an associated absolute or relative level of an input waveform.

Through finding optimal operating parameters, the system may take multiple portions during a given period. For instance, for an AC input, the system may take multiple portions in a half cycle of an AC period. Each portion may have a starting point and stopping point that may be determined based on operating factors/conditions to optimize performance of the system. Each portion may be characterized by determined positions (possibly a center position of the portion), starts, stops, widths, offsets, and delays. A portion may be characterized by a location along an input waveform. The location may include any combination of a position, a start, a stop, a width, an offset, a delay, a duration, etc. Operating parameters may be set to adjust the positions, starts, stops, widths, offsets, delays, etc. of the portions.

Each portion may be made up of further portions. In one embodiment, a portion may comprise multiple further portions, wherein each further portion may have determined characteristics such as positions, starts, stops, widths, delays, etc. In this way, a portion may be viewed as comprising narrower portions with determined characteristics similarly as characteristics are determined for any other portion. Any portion may be further made up of even narrower portions of increased resolution. As such, a first portion may be characterized as being made up of a homogeneous or inhomogeneous collection of determined further portions and each further portion may also comprise determined even further portions, and so on. In this way, a portion at a particular level of resolution may be characterized as having a duty cycle. Therefore, the system may set operating parameters to chop up an AC or DC input power in any pattern which may be determined to optimize performance. For example, portions may be determined and characterized by their positions, starting points, stopping points, delays, widths, etc. such that the portions may be regularly or irregularly spaced. In another example, the system may set operating parameters to take no portions of the input for one or more cycles or for a duration of time. The system may decide to use the full duty cycle of the input power for a period of time. The system may be flexible to chop up the input power to take the portions of the input power that result in the most efficient power conversion process while also taking into considerations any other operating factors/conditions as described previously. For instance, the system may chop up the input so that an output voltage is reliably and efficiently maintained while keeping harmonics generation, heat, ripple, and noise within acceptable levels.

Figure 4A:
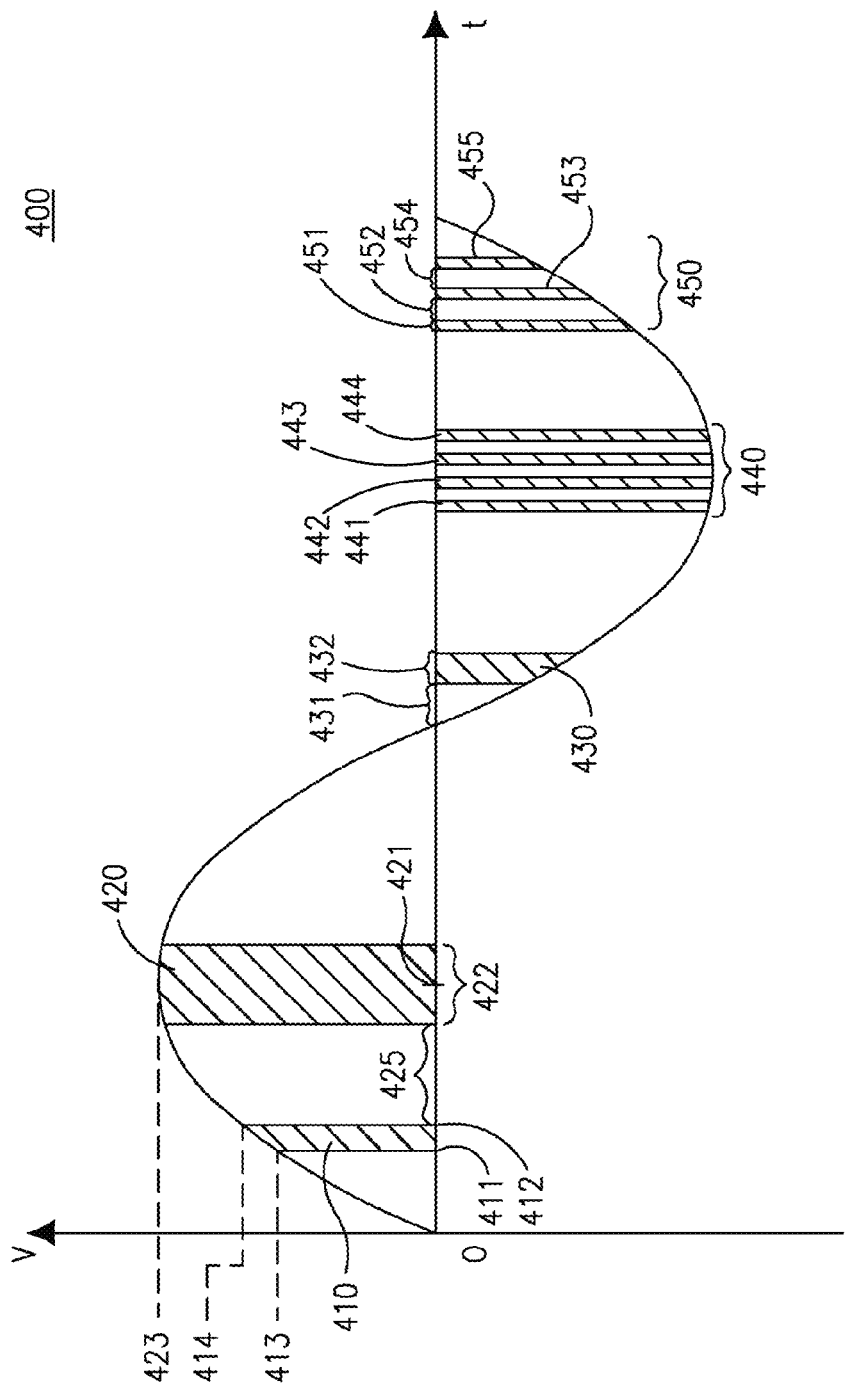
FIG. 4A is an exemplary diagram of an input source chopped for power conversion.

FIG. 4A depicts an example of an input being chopped by the system for use in power conversion. As shown in FIG. 4A, portion 410 may be characterized by a start time 411 and an end time 412. Start time 411 may correspond to a real-time starting voltage 413 and end time 412 may correspond to a real-time ending voltage 414. Portion 410 may alternatively or additionally be characterized by voltages 413 and 414. Portion 420 may be characterized by a position 421 and a duration 422 or by an average voltage 423, or it may alternatively or additionally be characterized by a delay 425 from a prior portion. Portion 430 may be characterized by an offset 431 from a prior event, for example from a zero-crossing as shown in FIG. 4A. Further, portion 430 may be further characterized by a width 432. A portion 440 may be made up of further portions 441, 442, 443, and 444. As explained above, the portions and the space between the portions may be homogenous or inhomogeneous. Portion 450 may also be made up of further portions, wherein portion 450 may have a different duty cycle than portion 440. The duty cycle of portion 450 may be characterized by the width of the portions 451, 453, 455 vs. the width of the gaps 452 and 454. Though FIG. 4A depicts several portions characterized in different exemplary manners, one should recognize any combination of characteristics may be used to define or characterize portions.

Figure 4B:
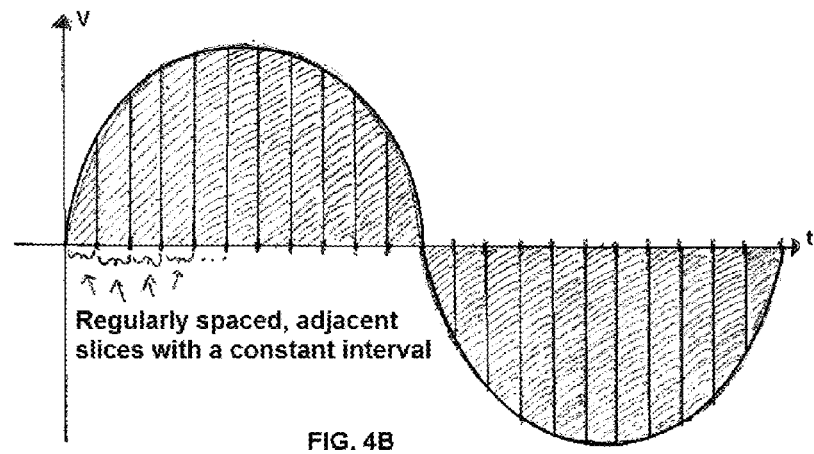
FIG. 4B is a exemplary diagram of an input source conventionally chopped for power conversion.
Figure 4C:
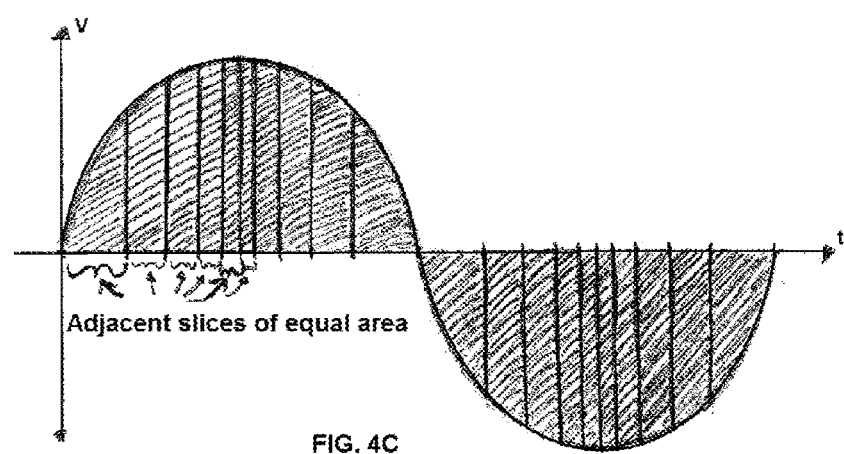
FIG. 4C is an exemplary diagram of an input source conventionally chopped for power conversion.

In contrast, FIGS. 4B and 4C illustrate two different types of conventionally chopped inputs of conventional converters. FIG. 4B illustrates a first conventionally chopped input voltage waveform. In this example, an associated switched power converter may be designed to chop the input such that each portion is substantially adjacent to the next portion such that substantially no gap exists between the portions, and all portion widths are equal. In practice, the switching time necessary to operate in the conventional power converter will generate a small gap. However, the system is not designed to implement a gap. It is merely a function of the finite switching time of the switches with which the conventional power converter harvests energy. Furthermore, the input is chopped such that all portions are the same from one period to the next across all periods. This can be seen by the first half-cycle of the waveform being chopped in the same manner as the second half-cycle of the waveform. One of ordinary skill in the art would recognize this would continue in a similar fashion for future sinusoidal periods of the waveform. In this way, the first conventional switched power converter harvests statically predetermined portions across the full AC waveform across all periods. In practical, conventional switched power converters, energy is not harvested from very low voltage portions of the waveform due to hardware limitations and available energy, however, the systems are still considered to be designed to harvest across all full half-waves of the AC waveform.

FIG. 4C illustrates a second conventionally chopped input voltage waveform. In this example, an associated switched power converter may be designed to chop the input such that each portion is substantially adjacent to the next portion such that no gap exists between the portions, and all portions occupy a substantially similar area under the curve. In practice, the switching time necessary to operate in the conventional power converter will generate a small gap. However, the system is not designed to implement a gap. It is merely a function of the finite switching time of the switches with which the conventional power converter harvests energy. In this way, the current drawn from the input may have a smaller difference from most current draw to least current draw for each portion by virtue of the widths of the portions increasing for lower voltages. The input voltage is chopped such that each half-cycle of the waveform is chopped in the same manner as any previous and subsequent half-wave. This can be seen by the first half-wave being chopped in the same manner as the second half-cycle of the waveform. One of ordinary skill in the art would recognize this would continue in a similar fashion for future sinusoidal periods of the waveform. In this way, the second conventional switched power converter harvests statically predetermined portions across the full AC waveform across all periods. In practical, conventional switched power converters, energy is not harvested from very low voltage portions of the waveform due to hardware limitations and available energy, however, the systems are still considered to be designed to harvest across all full half-waves of the AC waveform.

Figure 4D:
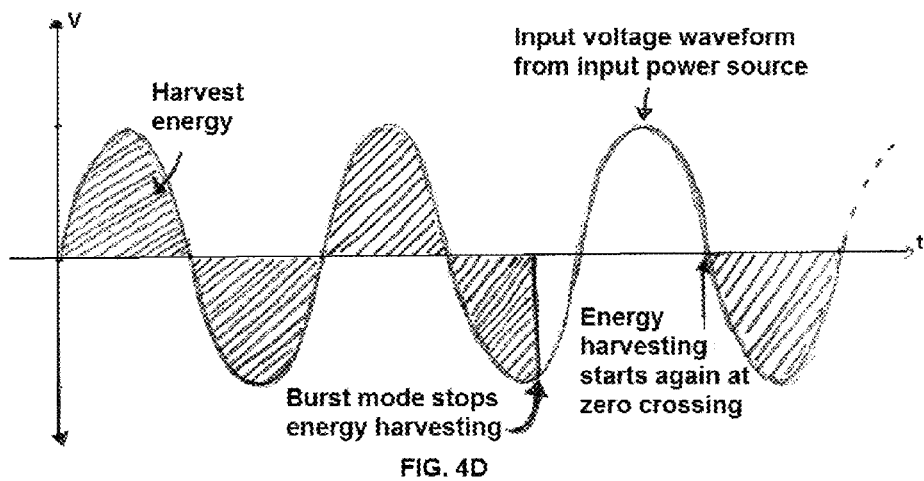
FIG. 4D is an exemplary diagram of an input source harvested with burst mode implemented in power conversion.

FIG. 4D illustrates burst mode operation in conventional power converters. Burst mode is a feature which may be incorporated into conventional power converters chopping input waveforms in the manner illustrated in FIG. 4B and FIG. 4C. Burst mode allows a power converter to stop harvesting energy from the input at any point in time once it has been determined that a sufficient energy has been stored in an energy storage device. Conventionally a power converter that is burst mode capable may stop harvesting energy from the input when a load is connected to the power converter which does not draw a great deal of power, enabling the power converter to cease harvesting energy from the input. Burst mode does not take into consideration changing operating factors/conditions but merely ceases energy harvesting when it is determined an energy storage device is sufficiently charged for the load. Once the load drains the energy storage device beyond a particular threshold, the power converter may restart harvesting of energy from the input at the next zero-crossing of the input waveform.

FIG. 4A illustrates a more flexible method and capability to chop the input for use in power conversion than that of FIG. 4B and FIG. 4C in combination or not with the burst mode capability illustrated in FIG. 4D. The system associated with FIG. 4A may be configured to chop any determined portion of the input waveform for use in power conversion. Exemplary gaps 425, 431, 452, and 454 in the chopping and harvesting of input waveform are seen. FIG. 4 clearly illustrates further unlabeled gaps before, after, and between harvested portions of the input waveform. In contrast, the waveforms of FIG. 4B and FIG. 4C have no gaps between portions. In this way, the full half-cycles of the waveforms of FIG. 4B and FIG. 4C are harvested. Furthermore, in FIG. 4A, the portions determined for harvesting in the first half-cycle of the waveform are different than those of the second half-cycle. In this way, the power conversion system corresponding to FIG. 4A may flexibly and determine portions of the input waveform to harvest and flexibly determine portions of the waveform to not harvest. This system may make these determinations in real-time and on the fly. This system may determine portions for harvesting and for avoiding based on present and changing operating factors/conditions. In contrast, the systems corresponding to FIGS. 4B and 4C perform statically determined switching wherein the systems are designed to perform switching at substantially the same position along the input waveform and across all periods. The systems of FIG. 4B and FIG. 4C lack the flexibility to choose the most preferred portions of the input for use in power conversion dependent on design preferences, operating parameters, operating factors/conditions, etc. that is implementable by the system corresponding to FIG. 4A.

In one embodiment of a power conversion system in accordance with the teachings herein, an energy storage device, such as a storage capacitor, may be charged in accordance with operating parameters and the voltage of the storage capacitor may be an operating factor/condition. The storage capacitor may be charged during one or more charging periods wherein the start and end of the one or more charging periods is determined based on the operating parameters. Operating parameters may also change during operation. Operating factors/conditions which may influence the operating parameters may include power conversion efficiency, harmonics, temperature, expected output voltage, stored energy level, inductance-based energy storage, storage capacitor voltage, start-up energy storage levels, output ripple, voltage and current draw of the load, rate of discharge of the storage capacitor, voltage and current of the input power source, frequency of the input power source, the rate of change or slope of the input power source, the resonant frequency and a change in the resonant frequency of an LLC converter, the temperature of the LLC converter, the present position along the input A/C waveform, the fluctuation profile of power consumption of the load, power factor, information or commands provided by the load or user, over-voltage and/or over-current conditions of the input power source and/or output, mechanical noise or vibrations, characteristics of the mechanical noise or vibrations, noise profile of the input, electromagnetic interference (EMI), any other factor which may be desirably affected, controlled, adjusted and/or monitored, and any combination thereof.

The storage capacitor may be charged to a voltage level depending on the present or predicted load requirements. In one embodiment, a load requirement may be predicted by measuring or determining a current draw of the load and predicting the energy necessary to support the predicted load requirements.

In another embodiment, the load requirement may be predicted by taking into account how the load behaved for a previously charged value. If, for instance, a prior prediction resulted in insufficient charge for the load, a storage capacitor charge may be increased. In this way, a charge of a storage capacitor may take into account a history of charging the capacitor to find an optimal predicted charge for the storage capacitor. As mentioned previously, in any embodiment any storage device or combination of storage devices may alternatively and similarly be used. For instance, a storage inductor, super capacitor, battery, or any other suitable storage device or combination of devices may be used and charged in a similar fashion.

In one embodiment, a processor or other suitable circuitry may count the number of times over an observation interval that a voltage on the storage capacitor is below a minimum threshold and when the count exceeds an error threshold, the system may change operating parameters to prevent future occasions of dropping below the minimum threshold. Further, the number of times corresponding to the error threshold and the observation interval over which the number of times are counted may be adjusted based on observed power conversion efficiency.

In another embodiment, the operating parameters may be adjusted immediately after the count exceeds an error threshold without waiting for the end of the observation interval. In another embodiment, the system may measure or determine the rate of discharge of the storage capacitor and adjust the operating parameters based on the rate of discharge.

In another embodiment, the system may observe the rate of discharge of energy stored in the storage capacitor to determine operating parameters for charging the storage capacitor. In another embodiment, the system may determine the rate of occasions at which the energy level in the energy storage device drops below a minimum threshold. When the system determines the rate of discharge of energy is lower than a threshold rate or the rate of occasions when the energy level drops below a minimum threshold is too infrequent, the system may adjust the operating parameters such that the storage capacitor may be charged less frequently or the system may suspend charging the storage capacitor for an extended period of time. In any embodiment, the system may determine or measure any other suitable indicator of a stored level of energy or rate of change of stored energy such as a voltage level, current level, power level, charge level, rate of change thereof, or any combination thereof.

The power conversion system may calculate several efficiency factors. An efficiency factor may be calculated by measuring the average actual power delivered to the load divided by the average actual power harvested from the input power source. Actual average input and output power are calculated by real-time measurements of actual real-time currents and voltages of the input and output. Different efficiency factors reflect averages over different durations of time. For example, the system may have three efficiency factors, calculated over 1 second, 10 seconds, and 1 minute. The system may decide the relative importance of the different efficiency factors depending on the operating factors/conditions.

During normal operation, the main controller may use the initial operating parameters as initial values for controlling power conversion. The main controller may adjust each operating parameter according to real-time reading or measuring of the factors/conditions. To determine how to adjust each parameter, the main controller may either set the parameter to a value based on a known or expected effect of the adjusted value, or it may empirically determine an optimal value for each operating parameter by intentionally varying the value and recording the effect. Through evaluating a history of the effect of adjustments to the operating parameters, the main controller may determine an optimal setting for each operating parameter associated with the present operating factors/conditions.

The main controller may adjust the operating parameters in a determined order. The determined order may be an order in which the operating parameters may be evaluated and recalibrated based on the magnitude of the effect of their adjustment on real-time observed power conversion efficiency or their effect on any other operating factor/condition. The determined order may also be based on or influenced by predefined preferences, preferred ordering, settings, user-selected inputs, load inputs, default settings, initial weighting of positioning in order, or any combination thereof. In one embodiment, the system may prioritize or prefer the stabilization of one or more of the operating factors/conditions such as output voltage, power factor, harmonics, etc. During the adjustment process, the main controller observes and/or samples the magnitude of the effects of the changes in the operating parameters on the power conversion efficiency of the system. Once an optimal setting is determined for a first operating parameter, the main controller may adjust the value of a second operating parameter and evaluate the magnitude of the effect of the change on power conversion efficiency.

If the magnitude of the effect of the change in the second operating parameter is above a threshold magnitude, the main controller may return to fine tune the value of the first operating parameter. The main controller may fine tune the value of the first operating parameter with a finer resolution than during the previous pass. The main controller may then continue to the next operating parameter to fine tune the value of the second operating parameter with a finer resolution than during the first pass. Such a process may continue in a loop fashion such that the main controller moves on to further operating parameter values once a previous value generates an effect on an operating factor/condition, such as efficiency, that is below a magnitude threshold associated with a value that results in an acceptable value for the operating factor/condition.

Each time an adjustment of the value of an operating parameter causes an effect having a magnitude which is beyond an acceptable threshold, the main controller may return to the first operating parameter and restart the adjustment and evaluation process through another pass. The effect of the change in the operating parameters may or may not be an absolute comparison of magnitudes. The comparison may be relative such that an effect due to a change in one operating parameter may be weighted compared to the effect of a change in another operating parameter. The change in an operating parameter may be weighted based on how significantly the change in the operating parameter affects the overall power conversion efficiency. In this way, the system may determine an optimal order in which to adjust operating parameters to arrive at an optimal power conversion efficiency. The system may increase the speed at which it determines optimal operating parameters corresponding to optimal power conversion efficiency by reordering the setting and adjusting of the operating parameters. In this way, the system may not just obtain optimal operating parameters, but may optimize the method in which it arrives at the optimal operating parameters.

In another embodiment, if any of the factors/conditions of the system changes, the system may restart the aforementioned calibration process. Further, the system may periodically or sporadically recalibrate even when changes in the factors/conditions of the system have not been observed. Further, a user or load device may override the order of operating parameter evaluation and adjustment and their values.

Figure 5:
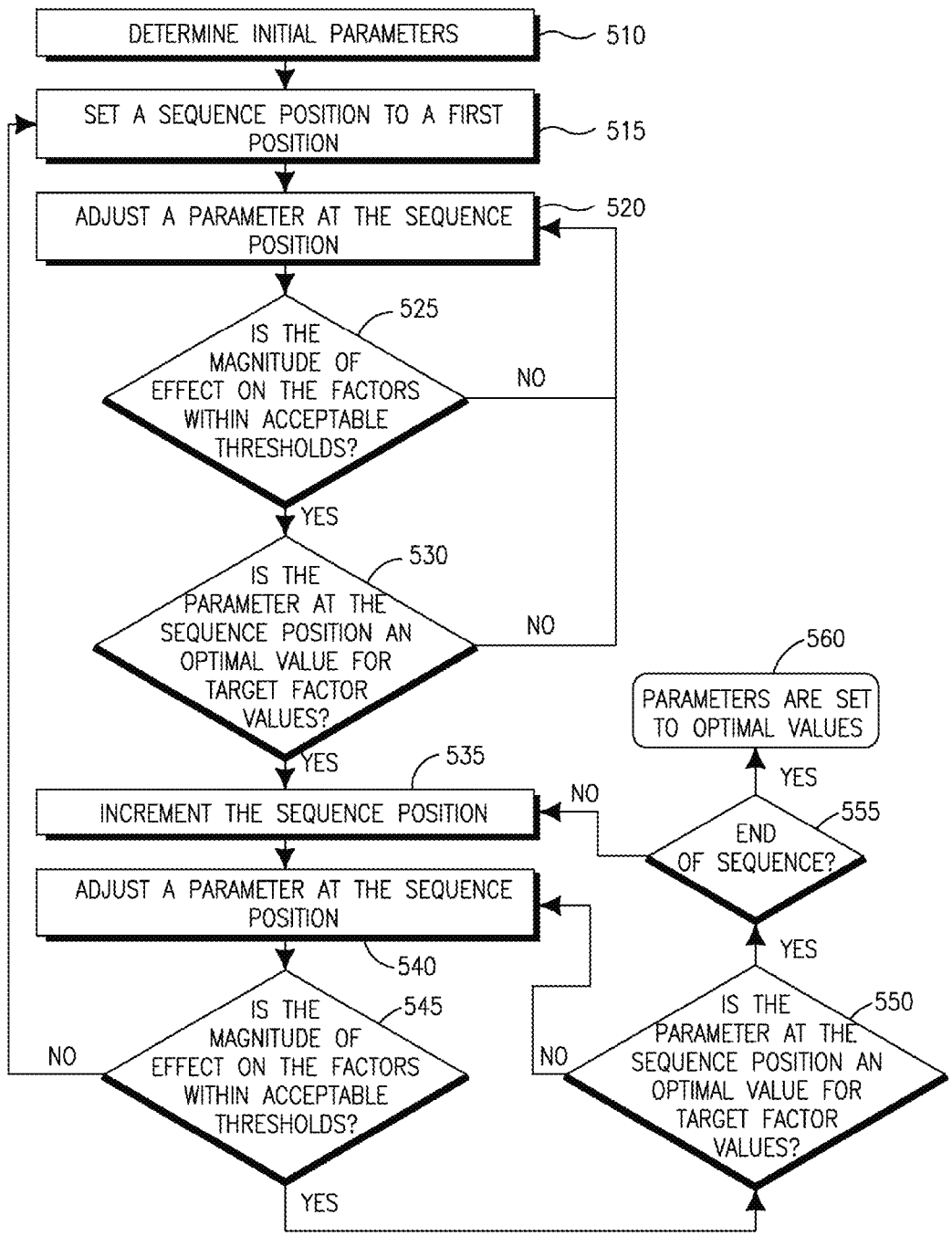
FIG. 5 is a flow diagram depicting an exemplary process for determining an order for adjusting operating parameters.

FIG. 5 includes a flow diagram depicting an exemplary process flow for one embodiment of the power conversion system. One should recognize this is one of many ways in which the system may evaluate and adjust operating parameters. The system may start at step 510 by determining initial operating parameter values. The system may then move to step 515 to set a sequence position to a first position. The system may then move to step 520 to adjust an operating parameter at the sequence position. For the first time through the process flow, this may be the operating parameter in the first position. The system may then move to step 525 to determine whether the effect on operating factors/conditions are within acceptable thresholds. If the magnitude of the effect is not acceptable, the system may return to step 520 to continue to adjust the operating parameter until the effect is determined to be within an acceptable threshold at step 525. The system may then move to step 530 to determine if the adjusted operating parameter is at an optimal value for target operating factor/condition values. If the adjusted operating parameter is not at an optimal value, the system may return to step 520 to adjust the operating parameter to find an optimal position. If the operating parameter is determined to be at an optimal value, the system may move to step 535 to increment the sequence position, effectively moving to the next operating parameter in the sequence. The next operating parameter may then be adjusted at step 540 and evaluated in a similar fashion to the first operating parameter at step 545. If the effect of the adjustment on the next operating parameter is not within acceptable thresholds, the system may return to the first operating parameter to readjust the first operating parameter. The system may continue to move through the parameters by returning to step 535 and moving on to step 540 to adjust the operating parameter values until each operating parameter adjustment causes an acceptable effect on the operating factors/conditions and the operating parameter values are determined to be optimal at step 550. The evaluation concludes when the system determines it has reached the end of the sequence at step 555 and the operating parameters are considered to be set to optimal values at step 560.

In another embodiment, the system may evaluate a first operating factor/condition based on the determined order and may decide whether to increase or decrease one or more operating parameters based on other operating factors/conditions. Alternatively, the system may increase or decrease the operating parameters without considering the other operating factors/conditions. Alternatively, the system may set operating parameter values. For instance, the system may cause a switch to open or close earlier or later than previously planned or may open or close a switch immediately and indefinitely. The system may immediately open a switch without considering the effect on an operating factor/condition.

Figure 6:
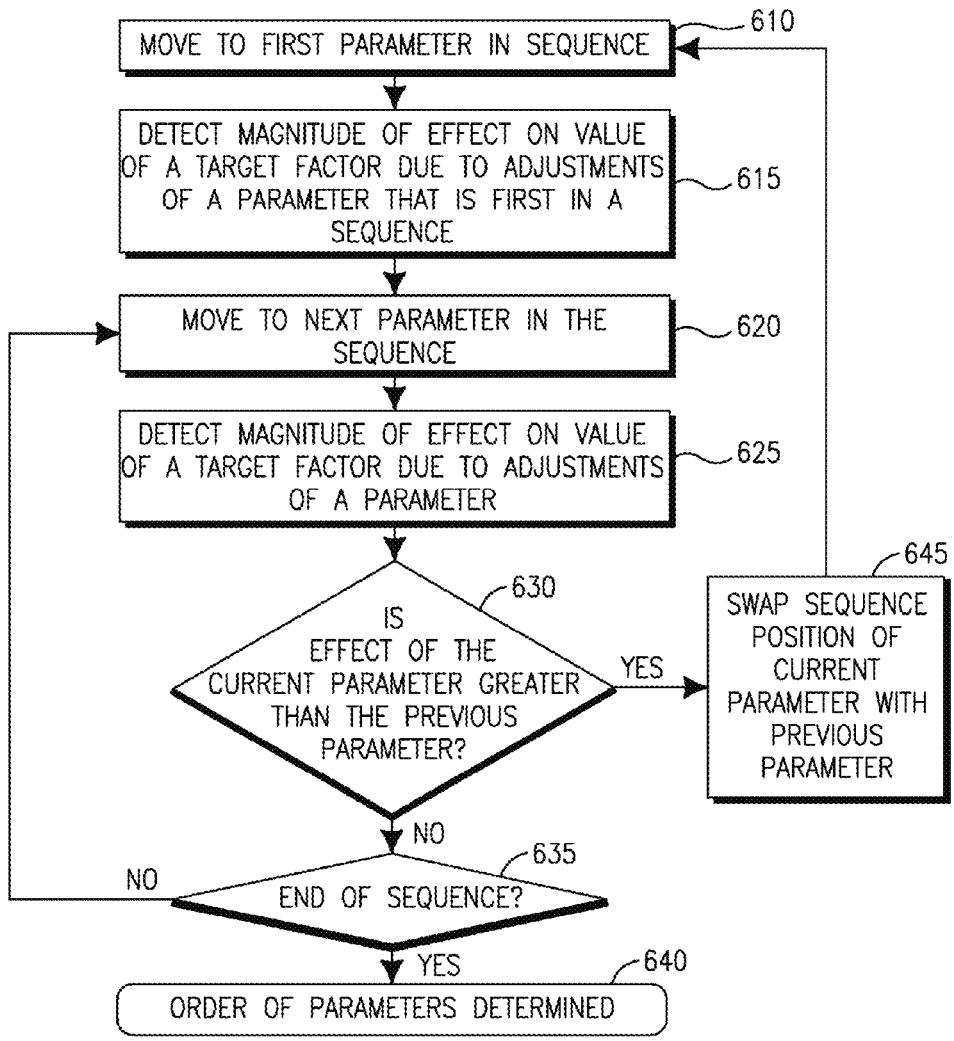
FIG. 6 is a flow diagram depicting another exemplary process for determining an order for adjusting operating parameters.

FIG. 6 includes a flow diagram depicting an exemplary process flow for one embodiment of the power conversion system for determining an order of evaluation and adjustment of operating parameters. One should recognize this is one of many ways in which the system may perform similar operations. The system may begin at step 610 by moving to a first operating parameter in a sequence and detecting an effect on a value of a target operating factor/condition due to adjustments of an operating parameter corresponding to the first position in the sequence at step 615. The system may then move to a next operating parameter in the sequence at step 620 and detect the effect on the value of the target operating factor/condition due to adjustments of the next operating parameter at step 625. At step 630, the system may then determine if the effect of adjustments of the next operating parameter are greater than the first operating parameter. If so, the system may move to step 645 to swap the position of the operating parameters in the sequence and return to step 610 to evaluate the first operating parameter in the sequence. In this way, the system may proceed through the sequence of operating parameters and rank them in a sequence such that the operating parameter with the greatest effect on a target operating factor/condition may be first and the operating parameter with the least effect may be last. The system may determine at step 635 if the end of the sequence has been reached, and if so, the system may conclude evaluation at step 640.

The system may prefer to adjust operating parameters in a particular order based on one or more operating factors/conditions or may ignore operating factors/conditions. For instance, the system may prefer to decrease the value of an operating parameter first before increasing the value to search for and determine optimal performance settings. The increasing or decreasing of the operating parameter may cause a switch to open or close sooner or later than previously set. The preference for the determined order of increasing or decreasing the values of the operating parameters may change due to changing operating factors/conditions. The system may learn through a history of observed effects of the change in operating parameters how to bias the preferred order for increasing or decreasing the operating parameters. The system may further learn the preferred magnitude of change with which to adjust the operating parameters. The system may also produce additional operating parameters. For instance, the system may decide to cause an additional opening and closing of a switch or may decide to remove an opening and closing of a switch from operation. Alternatively, the number of times switches are opened and closed may be an operating parameter and the system may appropriately adjust the number of times the switches chop the input. In this way, the system may take more or fewer portions from the input power.

In another embodiment, one or more operating factors/conditions may limit the adjustment of an operating parameter. For instance, a first operating condition/factor may improve by increasing an operating parameter, but a second operating condition/factor may trigger an event which may limit or stop the system from increasing the operating parameter. For example, the system may learn that the efficiency increases as it narrows the width of a portion of the input power. Therefore, the efficiency operating condition/factor would influence the system to narrow the portion. However, narrowing the portion may also increase output ripple voltage. Once the magnitude of the output ripple voltage exceeds a threshold, the system may limit the narrowing of the portion and hence limit the adjustment of the associated operating parameters.

In another embodiment, the system may predict future operating factors/conditions based on current and past operating factors/conditions to responsively adjust operating parameters. Further, the system may adjust its preferred target operating factors/conditions based on observations, trends, and predictions. For instance, the system may observe that the power consumption of the load is higher than expected and recalibrate the target energy storage voltage value operating condition/factor in order to compensate for a predicted need for additional energy in the energy storage. Therefore, the operating parameters are adjusted appropriately to charge the energy storage with sufficient energy. Further, the system may further take into account additional operating factors/conditions when adjusting the operating parameters. For instance, the system may take into account the position of the planned portion along the input AC waveform to influence how the system repositions and/or resizes the portion to take energy from the input waveform. For example, the system may shift the position of the planned portion towards the peak of the AC waveform to harvest additional energy from the input responsive to predicting elevated power requirements of the load.

In one embodiment, the system may adjust the operating parameters by an initial step size corresponding to an initial resolution. The step size may be adjusted according to observed trends in the effect of the change in the operating parameters on the operating factors/conditions. The system may adjust operating parameters with the chosen resolution while observing the effect of the change on the operating factors/conditions. The system may continue to change the operating parameters with the chosen resolution until the system observes or measures a degradation in one or more operating factors/conditions. The system may then readjust the operating parameters using a smaller or larger step size corresponding to a finer or coarser resolution.

Figure 7:
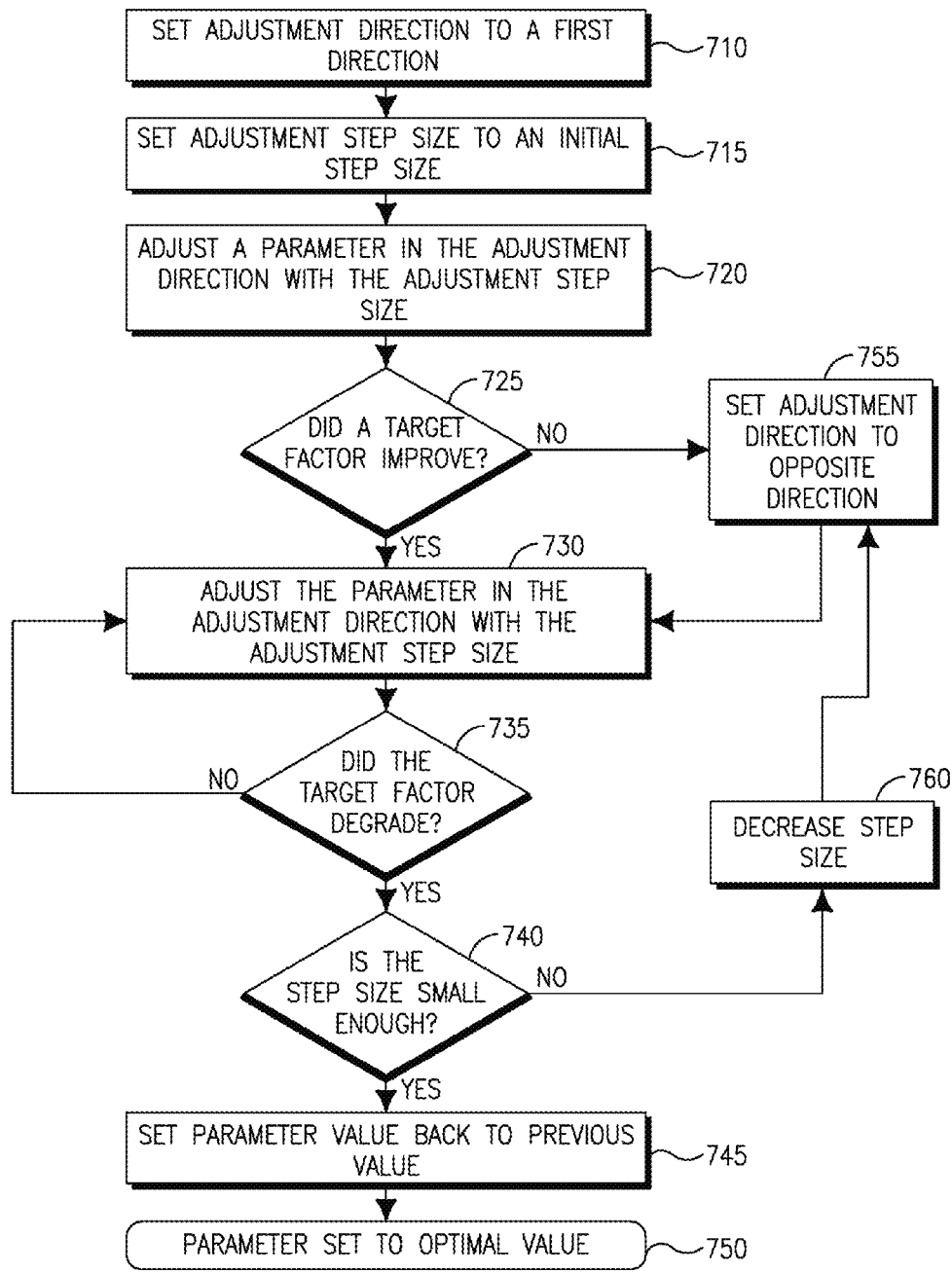
FIG. 7 is a flow diagram depicting an exemplary process for determining an optimal operating parameter value.

FIG. 7 includes a flow diagram depicting an exemplary process flow for one embodiment of the power conversion system for evaluating and adjusting operating parameters and determining a step size for adjusting the operating parameters. One should recognize this is one of many ways in which the system may perform similar operations. The system may begin at step 710 by setting an adjustment direction to a first direction and setting an initial step size at step 715. At step 720, the system may then adjust an operating parameter in the first direction with the initial step size. At step 725, the system may then determine if a target operating factor/condition improved. For instance, the system may evaluate whether an efficiency or output ripple level improved. If the target operating factor/condition improved, the system may continue to step 730 to adjust the operating parameter in the same direction and evaluate the target operating factor/condition to determine if it degraded at step 735. If at step 725, the system determines the target operating factor/condition did not improve, the system may move to step 755 to reverse the adjustment direction and then move to step 730 to adjust the parameter. Once the system determines a degradation in the target operating factor/condition following an improvement at step 735, the system may then determine if the step size is small enough at step 740. If the step size is determined to not be small enough at step 740, the system may move to step 760 to decrease a step size and then move to step 755 to reverse the direction of adjustment. In this way, the system may use an iteratively increased resolution to determine an optimal operating parameter setting for a target operating factor/condition. If the system determines at step 740 that a fine enough resolution has been used to adjust an operating parameter associated with a small enough size step, the system may move to step 745 to set the operating parameter back to the previous value before the last adjustment. The system may then move to step 750 to determine an optimal operating parameter value has been found.

Figure 8:
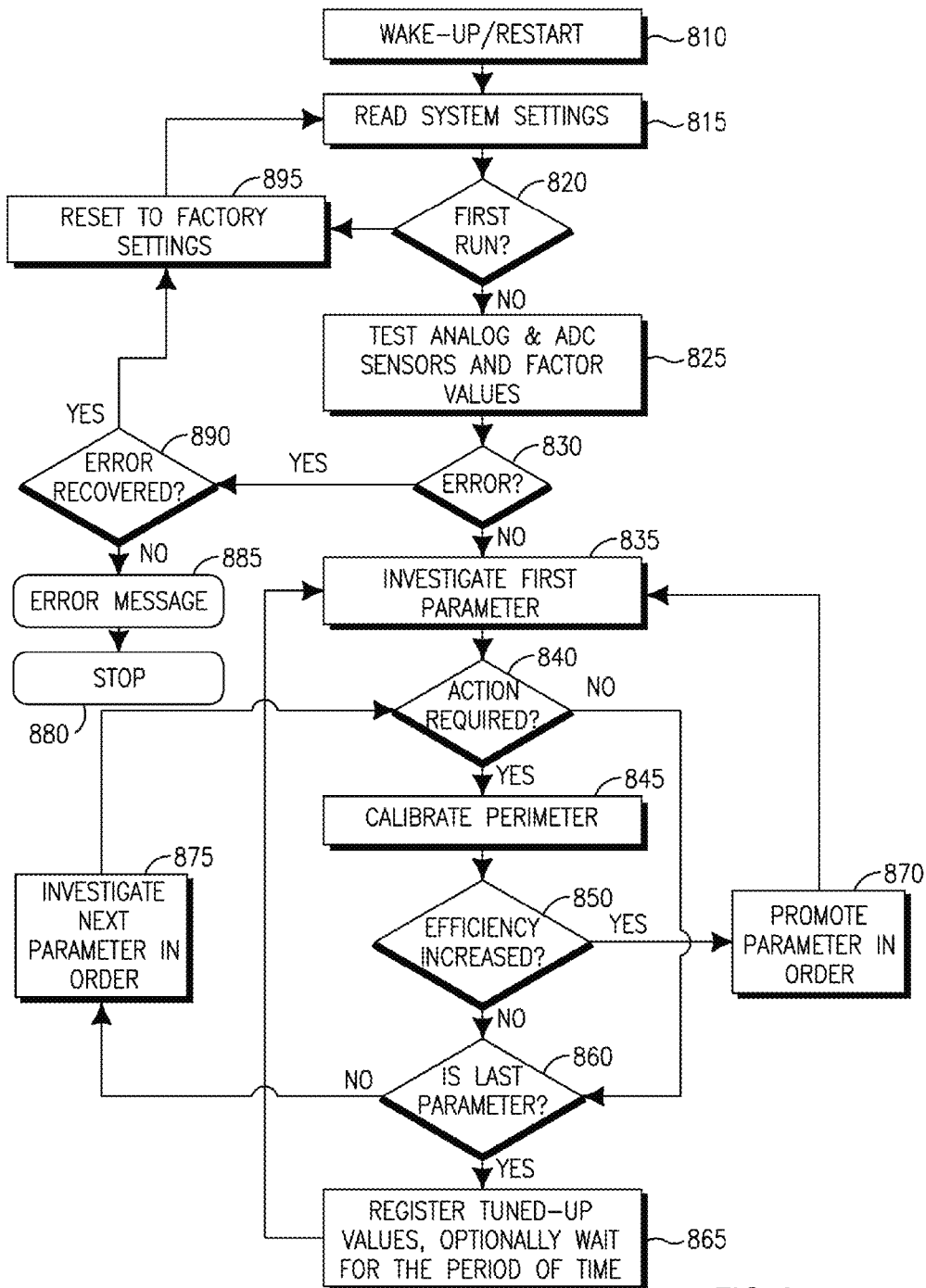
FIG. 8 is a flow diagram depicting an exemplary operating process of an embodiment of a power conversion system.

FIG. 8 includes a flow diagram depicting yet another exemplary process flow for an embodiment of the power conversion system. One should recognize this is one of many ways in which the system may perform similar operations. The process may begin at step 810 with a wake-up or restart operation. The system may then read system settings at step 815. The system may then determine if a first run through parameter calibration is being performed at step 820. If the system determines this is a first run, the system may reset to factory settings at step 895. If the system determines it is not a first run, the system may test analog sensors and analog to digital converter (ADC) sensors as well as test the values for operating factors/conditions at step 825. At step 830, the system may determine if an error or fault condition has occurred and if so, attempt to recover. If the recovery fails, the system may move to step 895 to reset to factory settings. If the system does not recover from the error, the system may output an error message at step 885 and stop at step 880. If no error or fault condition is present, the system may investigate a first operating parameter at step 835 and may determine if an action is required at step 840 based on the investigation. If the system determines an action is required, the system may calibrate the operating parameter at step 845. If the efficiency has been increased by the calibration, the system may move to step 870 to promote the operating parameter in the order of operating parameters such that it may be adjusted earlier in the order of operating parameters. If efficiency has not increased, the system may move to step 875 to investigate the next parameter in the order if the current operating parameter is not the last parameter. The system may continue in a similar fashion to move through the remaining operating parameters in the order and adjust operating parameters appropriately while reordering parameters based on their effects on efficiency. Once the system has investigated all operating parameters in the order, the system may register the operating parameters at step 865 so that the system operates and controls switching in accordance with the updated and calibrated operating parameters. The system may wait for a period of time before restarting the evaluation of parameters.

Figure 9:
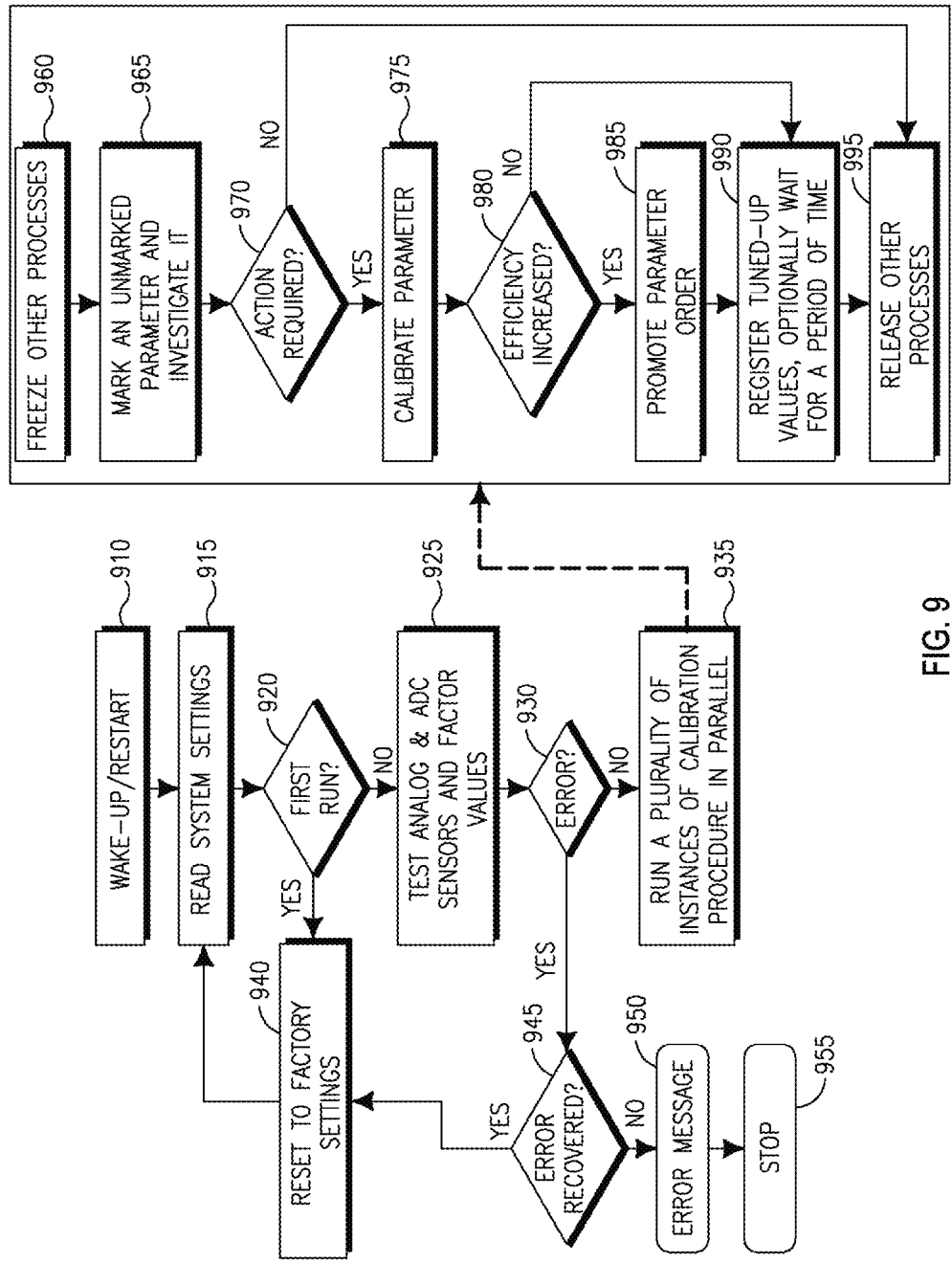
FIG. 9 is a flow diagram depicting another exemplary operating process of an embodiment of a power conversion system.

FIG. 9 includes a flow diagram depicting yet another exemplary process flow for an embodiment of the power conversion system. One should recognize this is one of many ways in which the system may perform similar operations. The process may begin with a wake-up or restart operation at step 910. The system may then read system settings at step 915. The system may then determine at step 920 if a first run through parameter calibration is being performed. If the system determines this is a first run, the system may reset to factory settings at step 940. If the system determines it is not a first run, the system may test analog sensors and analog to digital converter (ADC) sensors as well as test the values for operating factors/conditions at step 925. The system may determine if an error or fault condition has occurred at step 930 and if so, attempt to recover. If the recovery fails, the system may reset to factory settings at step 940. If the system does not recover from the error, the system may output an error message at step 950 and stop at step 955. If no error or fault condition is present, the system may run a plurality of instances of a calibration procedures in parallel at step 935.

The calibration procedure may start by freezing other processes at step 960. The system may then mark an unmarked operating parameter and investigate the operating parameter at step 965. At step 970, if the system determines an action is required, the system may calibrate the operating parameter at step 975. The system may determine if efficiency has been increased at step 980. If the efficiency has been increased by the calibration, the system may promote the operating parameter in the order of operating parameters at step 985 such that it may be adjusted earlier in the order of operating parameters. At step 990, the system may then register the operating parameter so that the system operates and controls switching in accordance with the updated and calibrated operating parameter. The system may wait for a period of time and/or may then release the other frozen processes at step 995.

In one embodiment, the system may evaluate one or more operating factors/conditions and may decide how to set and adjust operating parameters to chop the input. The system may evaluate one or more operating factors/conditions and may decide to chop the input into more and narrower portions based on the result of the evaluation. Alternatively, the system may evaluate one or more operating factors/conditions and may decide to chop the input into fewer and wider portions. For example, the system may prefer to chop the input into fewer and wider portions to improve efficiency. Reducing the number of times switching occurs, the system may reduce power losses associated with switch driving and reduce accumulated in-rush currents when the input voltage is near the peak of the AC waveform. However, the system may also be limited by other operating factors/conditions such as an acceptable level of harmonics. To limit harmonics, the system may prefer to chop the input into more, narrower, back-to-back portions over the full AC period. As such, the system may calibrate the operating parameters taking into account both efficiency and harmonics to find optimal operating parameters.

In another embodiment, the system may prefer to take portions of the input waveform positioned along the waveform at voltages slightly above the energy storage voltage rather than near the peak voltage of the input to improve power conversion efficiency. The preferred portions may start and end at voltages slightly above the energy storage voltage. The load may also demand energy at a rate such that the system may take other portions to supplement the supply of energy to the energy storage device. Further, the system may take other portions when taking harmonics or other operating factors/conditions into consideration.

Figure 10:
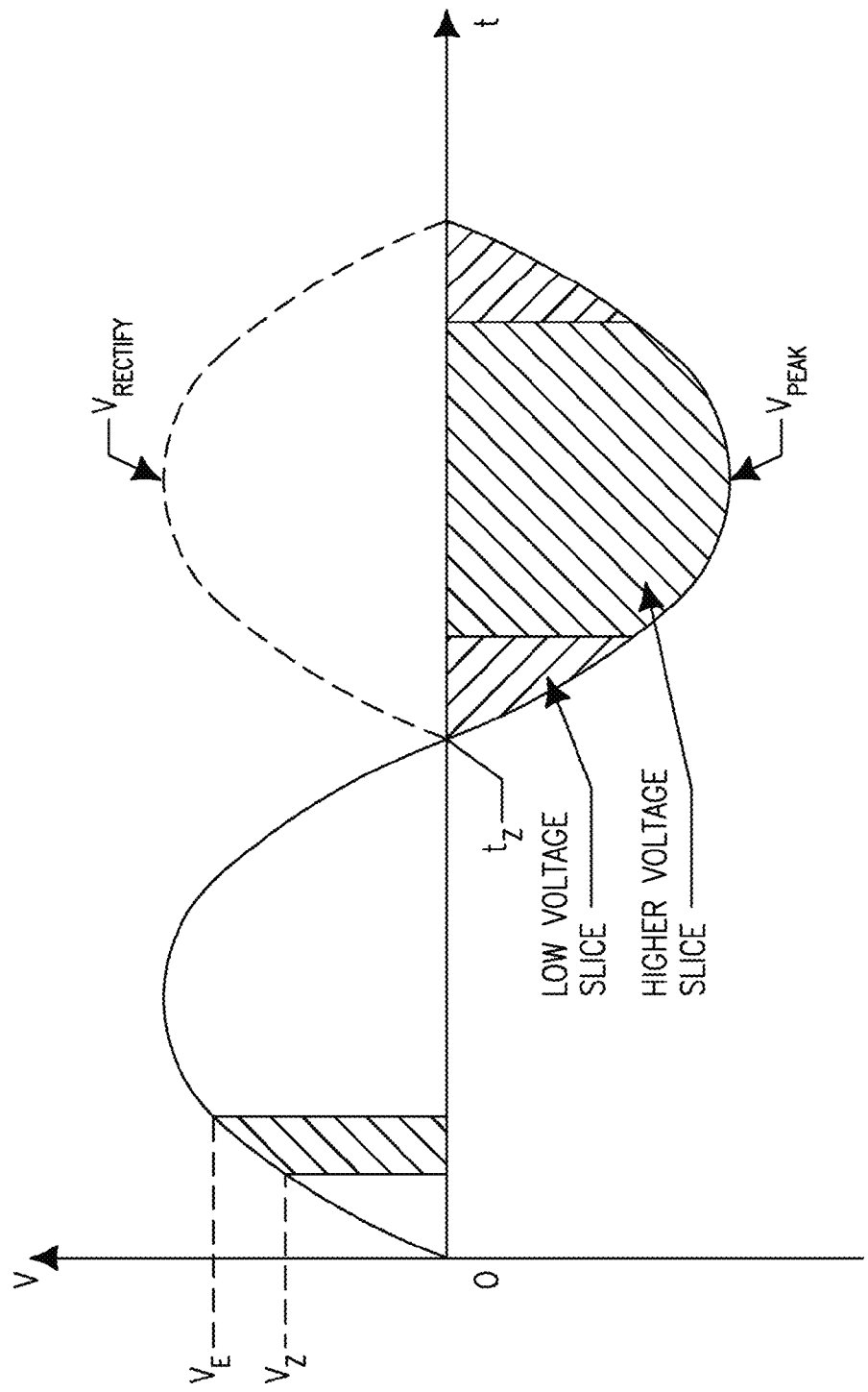
FIG. 10 is an exemplary diagram of an input source chopped for power conversion in various voltage ranges.

FIG. 10 depicts an example of chopping an input AC waveform by the power conversion system for conversion to an output power for a load. Vs may be the real-time voltage of the input at which the system begins taking energy from the input for a first portion and Ve may be the real-time voltage of the input at which the system stops taking energy from the input.

Vpeak may be the voltage peak of the AC input waveform. The system may set operating parameters to process and convert energy from the higher voltage portion by a first set of circuitry. The higher voltage portion may be taken from a region of the AC waveform which contains voltages high enough for generation of the output voltage while being sufficient for maintaining operating factors/conditions such as power factor correction, output ripple, etc. within acceptable thresholds. FIG. 10 depicts the system taking portions of non-rectified AC input, however, the system may also rectify the input. In one embodiment, the system may full-wave rectify the AC input waveform before selecting portions of the input. In another embodiment, the system may select portions of the input and only rectify the selected portions.

FIG. 10 depicts a lower voltage portion which may be used by the system for power conversion. The lower voltage portion may be taken from a region of the AC waveform that has voltages less than the desired output voltage. The lower voltage portion may be near the zero-crossing which takes place at $t_z$. The system may set operating parameters to process and convert the energy from the lower voltage portion with a second set of circuitry which may amplify the voltage from the lower voltage portion to a sufficient voltage for conversion and delivery to the output.

In another embodiment, the system may provide reports on the calibration history of the system. The system may provide reports on the history of efficiency, the history of events, the history of operating factors/conditions, the history of fault events, etc. Alternatively, indicators or displays may be provided to indicate any of the aforementioned histories or events.

In one exemplary embodiment, if the system detects a disconnection of the load, the order and setting of the values of the various parameters may be remembered for a period of time such that when the load is reconnected, the system may quickly arrive at near optimal operating factors/conditions without reordering the order of adjustment of operating parameters.

In another exemplary embodiment, if the system detects the load profile has changed significantly due to, for instance, a laptop starting up a hard drive, the main controller may reorder the order of adjustment of operating parameters and/or may return to varying the value of the operating parameters using a lower resolution.

In one embodiment, any operating condition/factor of the system may trigger an event. An event may be triggered when an operating condition/factor crosses a threshold which may be static, dynamically determined, user defined, or provided by the load. An operating condition/factor may have multiple thresholds associated with it. Responsive to an event, the system may decide to adjust operating parameters. Alternatively, the system may decide to maintain the current values of the operating parameters. Alternatively, the system may enter a fault condition wherein the system may shut itself down for a period of time or indefinitely, trigger an alert, transmit an error signal, transmit an error command/message, provide a visual error indicator, disconnect power to the load, disconnect itself from input power, require user intervention, automatically enter a recovery mode, or any combination thereof. The system may alternatively ignore an event.

In another embodiment, the system may set operating parameters so that switching of the switched power converter chops the input into narrow portions such that the duration of the portion is short enough to prevent saturation of the energy storage device. For instance, the system may chop the input sufficiently narrowly so that a storage capacitor is charged to a voltage less than the voltage of the input portion. For example, the system may take a portion of the input of 100V. The portion is narrow enough such that the energy it contains can only charge the storage capacitor to a voltage less than 100V.

Two examples of this concept are illustrated in FIG. 12. FIG. 12 shows plots of voltage vs. time for two examples of a portion delivered to a capacitors serving as an energy storage device, and the voltage of the capacitor. In both cases illustrated in FIG. 12, a portion of voltage Vchop is delivered to a capacitor, wherein the capacitor is charged to a voltage Vcharged which is less than Vchop wherein the capacitor is also not charged to a saturated level. The portion is narrow enough such that it stops charging the capacitor to a voltage less than Vchop and less than saturation. The capacitor's voltage is shown by Vcap as it is charging. As seen in both examples in FIG. 12, the portion ends before the capacitor voltage can charge up to the full voltage of Vchop. Furthermore, in both cases shown in FIG. 12, the capacitors may not be charged to saturation.

In yet another embodiment, the system may comprise several energy storage devices. The system may chop the input into narrow portions and direct the portions into one or more of the energy storage devices. The energy storage devices may be charged to a level less than or equal to the present input voltage. FIG. 12 illustrates two examples of this. By charging the storage devices to lower voltages, $\frac{1}{2}CV^2$ losses associated with charging the devices may be reduced compared to using a single energy storage device charged to the full input voltage. The system may spread out the discharging of the energy storage devices over time such that accumulated $i^2r$ losses associated with discharging the devices may be reduced. The system may spread out the discharging of the energy storage devices over time by sequentially discharging the energy storage devices.

In an exemplary embodiment, the system may include intermediate charging of capacitors wherein each intermediate capacitor is charged to a fraction of the input voltage or the voltage of the portion delivered to the capacitor. For instance, for n intermediate capacitors, each intermediate capacitor may be charged to Vin/n volts. Switches may discharge the intermediate capacitors to the energy storage device or to the load in accordance with the requirements of the load. The intermediate capacitors may be discharged simultaneously, alternating, in series with each other or in parallel with each other, or any combination of the aforementioned. The intermediate capacitors may be discharged to the storage capacitor, to the load, or may retain charge depending on the present demands or predicted demands of the storage capacitor or load.

In yet another embodiment, the system may include an additional energy storage component which may be used to reduce output ripple. For example, when the output ripple is close to or beyond an acceptable threshold, the additional energy storage component may be used to compensate the charging of the main energy storage capacitor. When the input voltage is near a zero-crossing, the input may not be able to provide sufficient energy to charge the energy storage capacitor. The system may then set operating parameters to cause the additional energy storage component to deliver energy to the main energy storage capacitor to compensate for the lack of energy from the input. The additional energy storage component may be recharged and discharged into the main energy storage capacitor when needed.

Figure 11:
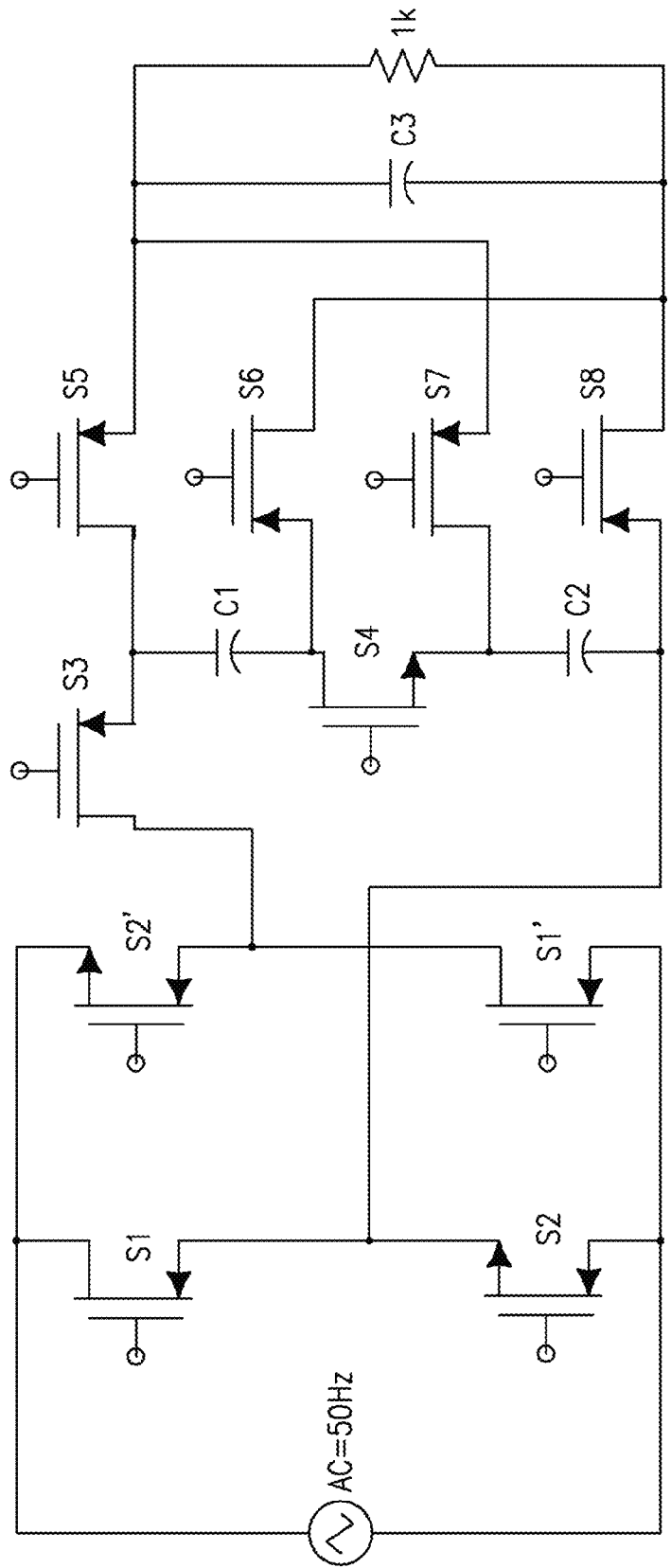
FIG. 11 is a circuit diagram of an exemplary embodiment of a power conversion system.

FIG. 11 depicts an exemplary embodiment of a power conversion system in accordance with the teachings above. While FIG. 11 shows the system with a particular number and configuration of switches, one skilled in the art should recognize the system may be implemented with fewer or additional switches. Furthermore, though the switches are depicted as transistors, one or more of the switches may be implemented with diodes, mechanical switches, or any other suitable electrical mechanism suitable for performing switching. One skilled in the art should also recognize that though FIG. 11 depicts capacitors, any suitable storage devices or combination of storage devices may be used. Furthermore, FIG. 11 depicts 2 capacitors, C1 and C2, in addition to storage capacitor C3, however any number of capacitors may be used. FIG. 11 further depicts a 1k resistor which is meant only as an exemplary load. Any load may be substituted in place of the 1k resistor. FIG. 11 further depicts a 50 Hz AC input power source, however an AC input power source, DC input power source, or any combination thereof, may be used.

As detailed above, the system may set operating parameters to control the switching of the switches depicted in FIG. 11 to take appropriate portions of the input while controlling the stored energy in capacitors C1, C2, and C3. In the system depicted in FIG. 11, switches S1, S2, S1', and S2' may be switched to function as a rectifying diode bridge. Switches S1, S2, S1' and S2' may be controlled by sensing zero-crossings of the input and setting operating parameters to open and close the switches appropriately to rectify the input. Furthermore, switches S1, S2, S1', and S2' may be controlled based on the capacitance values of C1, C2, and C3 and may further be controlled based on the energy stored in the capacitors. Alternately, if a diode bridge were used, switch S3 may be used and switched accordingly. Furthermore, the combination of the switches S1, S2, S1', and S2' may be controlled in a manner that may eliminate a need for S3. Switch S4 may allow a charge supplied from the source, and limited by switch S3 or the combination of switches 51 and S2, to be split between capacitors C1 and C2. In accordance with the teachings above, each of capacitors C1 and C2 may then be charged to a voltage that is less than the supplied voltage. In this case, capacitors C1 and C2 may split the supplied voltage evenly, such that half the supplied voltage is seen across each capacitor. As such, $\frac{1}{2} CV^2$ losses may be $\frac{1}{4}$ of those that would be seen by charging to the full voltage. Switches S5-S8 may be switched appropriately to charge the energy storage capacitor C3 when needed. The capacitors C1 and C2 may be used as a charge source to top up the energy storage capacitor C3. Switches S5-S8 may be switched so that capacitors C1 and C2 are sequentially discharged into capacitor C3 to reduce $i^2 r$ losses. While an input voltage is low, the switches may be controlled so that charge from the input is transferred directly to C3 without first charging capacitors C1 and C2.

In yet another embodiment, the system may set operating parameters to compensate for a value of a circuit component or to adjust a value of a circuit component. For instance, switches may exist in the system which may couple in an additional capacitor in parallel with another capacitor to increase the total effective capacitance seen between the two nodes of the capacitor. The system may connect any number of additional capacitors to adjust an effective capacitance value. In a similar fashion, the system may connect in, for example, additional resistors, capacitors, inductors, and transistors to effectively change the values of other components in the system. Any other circuit components may be connected through switches of any sort or any other mechanism to alter or compensate for the value of other components. In another embodiment, the system may include an LLC converter. Operating parameters may be set to connect additional components into the circuit to adjust a resonant frequency of the LLC converter.

In yet another embodiment, the system may increase a number of channels through which a load is powered or through which an energy storage device is charged to decrease losses and effectively increase efficiency. The system may determine for a particular load demand to increase the number of channels and hence increase the amount of metal through which the current from the system travels to reduce a trace resistance which may reduce losses associated with the trace resistance.

In yet another embodiment, a system may include an LLC converter. The system may sample a self resonance of the LLC converter by sending one or more pulses to the coils of the LLC converter. The pulses may be short and the coils may not be loaded. The coils may be grounded during the sampling. The system may measure the time it takes for energy from the pulse to return and through this measurement determine the resonant frequency. The LLC converter has a resonance, and hence a pulse injected into the LLC converter may return periodically, with decreasing energy each subsequent period, at a rate of the resonant frequency. The system may determine the resonant frequency based on the observed rate of the returned, periodic pulses.

In yet another embodiment, a system may sense the temperature of the coils of an LLC converter and may change operating parameters based on the sensed temperature or a change in the temperature. A change in the temperature of the coils of an LLC converter may cause a change in the resonant frequency of the LLC converter. The system may seek to deliver voltage portions harvested from the input and may deliver them to the LLC converter at a frequency of the resonant frequency. In this way, the system may seek to synchronize timing of chopping of the input and delivery of the input portions to the LLC converter.

In yet another embodiment, a system may sense/measure a power draw of a load and sense the temperature of the LLC converter. The system may compare a change of a power draw of a load to a change in the temperature of the LLC converter. The system may determine for a measured change in the draw of the load an appropriate change in the temperature of the LLC converter. If the system determines a different temperature change should have occurred for a measured change in the draw of the load, the system may determine portions are not being delivered to the LLC converter optimally, possibly due to a changed LLC resonant frequency, and may adjust operating parameters to compensate how the input portions are harvested and delivered to the LLC converter. As detailed previously, the system may adjust operating parameters by empirically observing whether the adjustment improves or degrades the efficiency of the system. Based on the empirical observations, the system may adjust the operating parameters to adjust the frequency of the portions to determine the most efficient frequency to mate with the resonant frequency of the LLC converter. For example, an LLC converter may have a nominal resonant frequency of 120 kHz, however temperature fluctuations and a change in load power draw may cause this resonant frequency to change. The system may adjust operating parameters to compensate for this change.

In yet another embodiment, the system may compare an observed result of delivering a portion to the LLC converter to an expected result. The system may determine when the observed result is not the same as the expected result that operating conditions may have changed and the system may adjust operating parameters to compensate. In one example, fluctuations in the magnetic field of the coils of the LLC converter may occur. The system may observed these disturbances through measurements of currents and voltages and adjust operating parameters to compensate. In one example, the system may adjust the timing of the input portions being delivered to the LLC converter, the frequency of the input portions being delivered to the LLC converter, or both, to compensate for non-ideal observed operating conditions. In this way, the system may attempt to optimize efficiency while the system experiences non-ideal disturbances by compensating for the disturbances. The system may adjust operating parameters to synchronize with the timing of the resonance of the energy in the LLC converter to increase efficiency.

In yet another embodiment, the system may prefer to take wider portions from regions of an input AC waveform in the voltage ranges of the AC waveform near the zero crossings, and may prefer to take narrower portions from regions of the input AC waveform in the voltage ranges of the AC wave form near the peak of the AC waveform. The system may vary the width of the portions to harvest sufficient energy to charge a capacitor without harvesting more than necessary to charge the capacitor. By taking wider and narrower portions, the system may be deviating from the resonant frequency of the LLC converter which may result in less than optimal efficient. As such, the system may adjust operating parameters to seek to harvest portions with an average frequency that synchronizes with the resonant frequency of the LLC converter.

In yet another embodiment, a system may use a capacitor to delay the delivery of the voltage of an input portion to the coils of the LLC converter. The system may set operating parameters to adjust the number of capacitors, and hence the effective capacitance, used to delay the voltage of an input portion. In this way, the system may compensate for portions being taken at frequencies that diverge from the resonant frequency of the LLC converter and synchronize the delivery of the portions to the resonance of the LLC converter.

In yet another embodiment, a system may set operating parameters to adjust the voltage level that is delivered to the coils to synchronize power transfer with the resonance of the coils. The system may adjust a voltage level on a storage capacitor or adjust a gain or amplification to adjust the voltage level that is delivered to the coils. Also, by increasing/amplifying the voltage of an input portion, the system may reduce the overall effect of diode-drop type losses associated with transistors used in the path which may increase efficiency.

In yet another embodiment, a system may set operating parameters to accumulate a plurality of portions before delivery them to the LLC converter. The system may accumulate energy from multiple portions to improve synchronization with the resonance of the LLC converter. The system may set operating parameters to collect portions, wait a period of time before collecting a portion, or stop collecting portions to improve the synchronization of the delivery of the portions with the resonances of the LLC. The system may skip harvesting a portion from the input because a capacitor intended to store the energy of the portion is fully charged. The system may also immediately stop harvesting a portion from the input so that it may be immediately delivered to the LLC converter to improve synchronization with the resonances of the LLC converter. In this way, the system configured to set operating parameters to flexibly adjust the timing of the chopping of the input and the delivery of the portions to the LLC converter to synchronize with the resonance of the LLC converter which may improve the overall efficiency of the system.

In yet another embodiment, the system may detect it has been disconnected from an input power and may set operating parameters to allow a draining resistance to discharge energy across the draining resistance. The system may implement the draining resistance in a fail-safe mode wherein the system may actively keep the resistance as an open so that it does not dissipate power while the system is connected to an input power, but closes across line and neutral to discharge energy when the system is disconnected from power. FIG. 2 illustrates an example of control signals being received by the EMI filter and input protection stage. Such control signals may control the state of the draining resistance and may effectively keep the draining resistance open while connected to input power.

In yet another embodiment, the system may set operating parameters to adjust a number of EMI filters applied to the input of the system based on a measured load. For lower load draws, for instance under 70 watts, the system may only connect one EMI filter. For higher load draws, for instance over 70 watts, the system may connect a plurality of EMI filters. FIG. 2 illustrates an example of control signals being received by the EMI filter and input protection stage. Such control signals may control the number of EMI filters connected. By connecting only the necessary number of EMI filters for a given load, the system may reduce losses that may have been introduced by the extra EMI filters and thereby improve efficiency.

The aforementioned embodiments provide a wealth of solutions for flexibly and efficiently converting an input power into an output power. Although the embodiments describe exemplary arrangements and combinations of features, a system in accordance with the teachings herein may incorporate any combination of the described features, capabilities, and configurations. One of ordinary skill in the art will appreciate that each embodiment, feature, or element can be used alone or in any combination with the other embodiments, features, and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement an AC to DC power converter, DC to DC power converter, power supply, voltage/current supply, energy storage, or any other form of electrical converter.

What is claimed is:

1. A power converter comprising:
    an input configured to receive an input power waveform from an input power source;
    a switched power converter configured to:
        select locations of one or more portions of the input power waveform such that the one or more portions are inhomogeneously positioned along the input power waveform and the one or more portions are inhomogeneously sized; and
        harvest energy from the one or more portions of the input power waveform, wherein the harvested energy of the one or more portions is substantially less than the available energy of the input power waveform;
    an energy storage device; and
    an output stage configured to:
        receive the harvested energy;
        convert the harvested energy into a converted energy; and
        store the converted energy in the energy storage device.

2. The power converter of claim 1, wherein the switched power converter is further configured to:
    select a location of a first portion of the one or more portions of the input power waveform; and
    select a location of a second portion of the one or more portions of the input power waveform;
    wherein the location of the first portion is substantially separated in time from the location of the second portion such that the first portion is not adjacent to the second portion.

3. The power converter of claim 2, wherein the input power waveform is an alternating current (AC) input power waveform.

4. The power converter of claim 3, wherein switched power converter is further configured to selected locations of the one or more portions such that the one or more portions are positioned along the same half-wave of the AC input power waveform.

5. The power converter of claim 4, wherein no portions of the AC input power waveform are selected at a position between the first portion and the second portion.

6. The power converter of claim 5, wherein the first portion is positioned prior to a peak of the half-wave and the second portion is positioned after the peak of the half-wave.

7. The power converter of claim 5, wherein both the first portion and the second portion are positioned on the same side of the peak of the half-wave.

8. The power converter of claim 2, wherein the location of the first portion includes a width of the first portion and the location of the second portion includes a width of the second portion;
    wherein the switched power converted is further configured to select the width of the first portion and the width of the second portion; and
    wherein the width of the first portion is different than the width of the second portion.

9. The power converter of claim 1, wherein the output stage is further configured to supply a substantially direct current (DC) voltage to a load device.

10. A method for converting power in a power converter, the method comprising:
    receiving an input power waveform from an input power source;
    selecting locations of one or more portions of the input power waveform such that the one or more portions are inhomogeneously positioned along the input power waveform and the one or more portions are inhomogeneously sized;
    harvesting energy from the one or more portions of the input power waveform, wherein the harvested energy of the one or more portions is substantially less than the available energy of the input power waveform;
    converting the harvested energy into a converted energy; and
    storing the converted energy in an energy storage device.

11. The method of claim 10, further comprising:
    selecting a location of a first portion of the one or more portions of the input power waveform; and
    selecting a location of a second portion of the one or more portions of the input power waveform;
    wherein the location of the first portion is substantially separated in time from the location of the second portion such that the first portion is not adjacent to the second portion.

12. The method of claim 11, wherein the input power waveform is an alternating current (AC) input power waveform.

13. The method of claim 12, further comprising selecting locations of the one or more portions such that the one or more portions are positioned along the same half-wave of the AC input power waveform.

14. The method of claim 13, wherein no portions of the AC input power waveform are selected at a position between the first portion and the second portion.

15. The method of claim 14, wherein the first portion is positioned prior to a peak of the half-wave and the second portion is positioned after the peak of the half-wave.

16. The method of claim 14, wherein both the first portion and the second portion are positioned on the same side of the peak of the half-wave.

17. The method of claim 11, wherein the location of the first portion includes a width of the first portion and the location of the second portion includes a width of the second portion;
    wherein the method further comprises selecting the width of the first portion and the width of the second portion; and
    wherein the width of the first portion is different than the width of the second portion.

18. The method of claim 10, further comprising:
    supplying a substantially direct current (DC) voltage to a load device.

19. A power converter comprising:
    an input configured to receive an input power waveform from an input power source;
    a switched power converter configured to:
        select a location of a first portion of the input power waveform including a width of the first portion and select a location of a second portion of the input power waveform including a width of the second portion, wherein the location of the first portion is substantially separated in time from the location of the second portion such that the first portion is not adjacent to the second portion, and wherein the width of the first portion is different than the width of the second portion; and harvest energy from the first portion and the second portion, wherein the harvested energy of the first portion and the second portion is substantially less than the available energy of the input power waveform;

an energy storage device; and an output stage configured to:

receive the harvested energy;

convert the harvested energy into a converted energy; and store the converted energy in the energy storage device.

20. The power converter of claim 19, wherein the switched power converter is further configured to:

select the location the first portion and the location of the second portion such that the first portion and the second portion are inhomogeneously positioned along the input power waveform and the first portion and the second portion are inhomogeneously sized.

\* \* \* \* \*